(12) United States Patent
Fourguette et al.

(10) Patent No.: US 8,743,372 B2
(45) Date of Patent: Jun. 3, 2014

(54) WHISPERING-GALLERY-MODE-BASED SEISMOMETER

(75) Inventors: Dominique Claire Fourguette, Los Angeles, CA (US); M. Volkan Otugen, Dallas, TX (US); Liane Marie Larocque, Los Angeles, CA (US); Greg Alan Ritter, Hamburg, MI (US); Jason Jeffrey Meeusen, Howell, MI (US); Tindaro Ioppolo, Dallas, TX (US)

(73) Assignees: Michigan Aerospace Corporation, Ann Arbor, MI (US); Southern Methodist University, Dallas, TX (US)

( * ) Notice: Subject to any disclaimer, the term of this patent is extended or adjusted under 35 U.S.C. 154(b) by 437 days.

(21) Appl. No.: 13/226,466

(22) Filed: Sep. 6, 2011

(65) Prior Publication Data

US 2012/0056072 A1  Mar. 8, 2012

Related U.S. Application Data

(60) Provisional application No. 61/380,176, filed on Sep. 3, 2010.

(51) Int. Cl.
*G01B 9/02* (2006.01)

(52) U.S. Cl.
USPC .......................................................... 356/480

(58) Field of Classification Search
USPC ................................ 356/480, 35.5
See application file for complete search history.

(56) References Cited

U.S. PATENT DOCUMENTS

| | | | |
|---|---|---|---|
| 2,088,703 A | 8/1937 | Hubbard et al. | |
| 2,576,775 A | 11/1951 | Case | |
| 3,685,011 A | 8/1972 | Lehner | |
| 4,238,845 A | 12/1980 | Haggard et al. | |
| 4,280,206 A | 7/1981 | Guralp | |
| 4,296,483 A | 10/1981 | Haill | |
| 4,623,991 A | 11/1986 | Vitringa | |
| 4,792,708 A | 12/1988 | Boyer | |
| 5,895,033 A | 4/1999 | Ross et al. | |
| 5,915,677 A | 6/1999 | Yajima et al. | |
| 5,932,860 A | 8/1999 | Plesko | |
| 5,996,416 A | 12/1999 | Eguchi | |
| 6,223,598 B1 | 5/2001 | Judy | |
| 6,382,606 B1 | 5/2002 | Horng | |

(Continued)

OTHER PUBLICATIONS

USPTO Office Action in U.S. Appl. No. 13/225,537 mailed on Jul. 22, 2013, List of references cited by application and Considered by examiner, and Search Information, 13 pp.

(Continued)

*Primary Examiner* — Jonathan Hansen
(74) *Attorney, Agent, or Firm* — Juan Carlos A. Marquez; Morris, Manning & Martin, LLP

(57) ABSTRACT

A whispering-gallery-mode-based seismometer provides for receiving laser light into an optical fiber, operatively coupling the laser light from the optical fiber into a whispering-gallery-mode-based optical resonator, operatively coupling a spring of a spring-mass assembly to a housing structure; and locating the whispering-gallery-mode-based optical resonator between the spring-mass assembly and the housing structure so as to provide for compressing the whispering-gallery-mode-based optical resonator between the spring-mass assembly and the housing structure responsive to a dynamic compression force from the spring-mass assembly responsive to a motion of the housing structure relative to an inertial frame of reference.

62 Claims, 21 Drawing Sheets

(56) References Cited

U.S. PATENT DOCUMENTS

| | | | |
|---|---|---|---|
| 6,668,111 B2 * | 12/2003 | Tapalian et al. | ............... 385/28 |
| 7,013,730 B2 | 3/2006 | Malametz | |
| 7,024,933 B2 | 4/2006 | Malametz | |
| 7,137,299 B2 | 11/2006 | Meyer | |
| 7,244,926 B2 | 7/2007 | Ja et al. | |
| 7,280,290 B2 | 10/2007 | Araki et al. | |
| 7,389,025 B2 | 6/2008 | Smith et al. | |
| 7,435,944 B2 | 10/2008 | Ja et al. | |
| 7,491,491 B2 | 2/2009 | Arnold et al. | |
| 7,532,790 B2 | 5/2009 | Smith et al. | |
| 7,559,238 B1 | 7/2009 | Smith et al. | |
| 7,701,586 B2 | 4/2010 | Otugen et al. | |
| 7,714,271 B1 | 5/2010 | Levine | |
| 2008/0123242 A1 | 5/2008 | Zhou | |
| 2008/0158542 A1 | 7/2008 | Otugen et al. | |
| 2008/0284078 A1 | 11/2008 | Wolter et al. | |
| 2009/0190136 A1 | 7/2009 | Arnold et al. | |
| 2010/0326200 A1 * | 12/2010 | Sheverev et al. | ............... 73/800 |

OTHER PUBLICATIONS

Unknown Author, downloaded from Internet at http://metrology.hut.fi/courses/s108-j/Nano2.pdf on May 15, 2009.

Ioppolo, Tindaro; Kozhevnikov, Michael; Stepaniuk, Vadim; Ötügen, M. Volkan; and Sheverev, Valery Sheverev, "Micro-optical force sensor concept based on whispering gallery mode resonators," Applied Opticsl, Jun. 1, 2008, pp. 3009-3014.

* cited by examiner

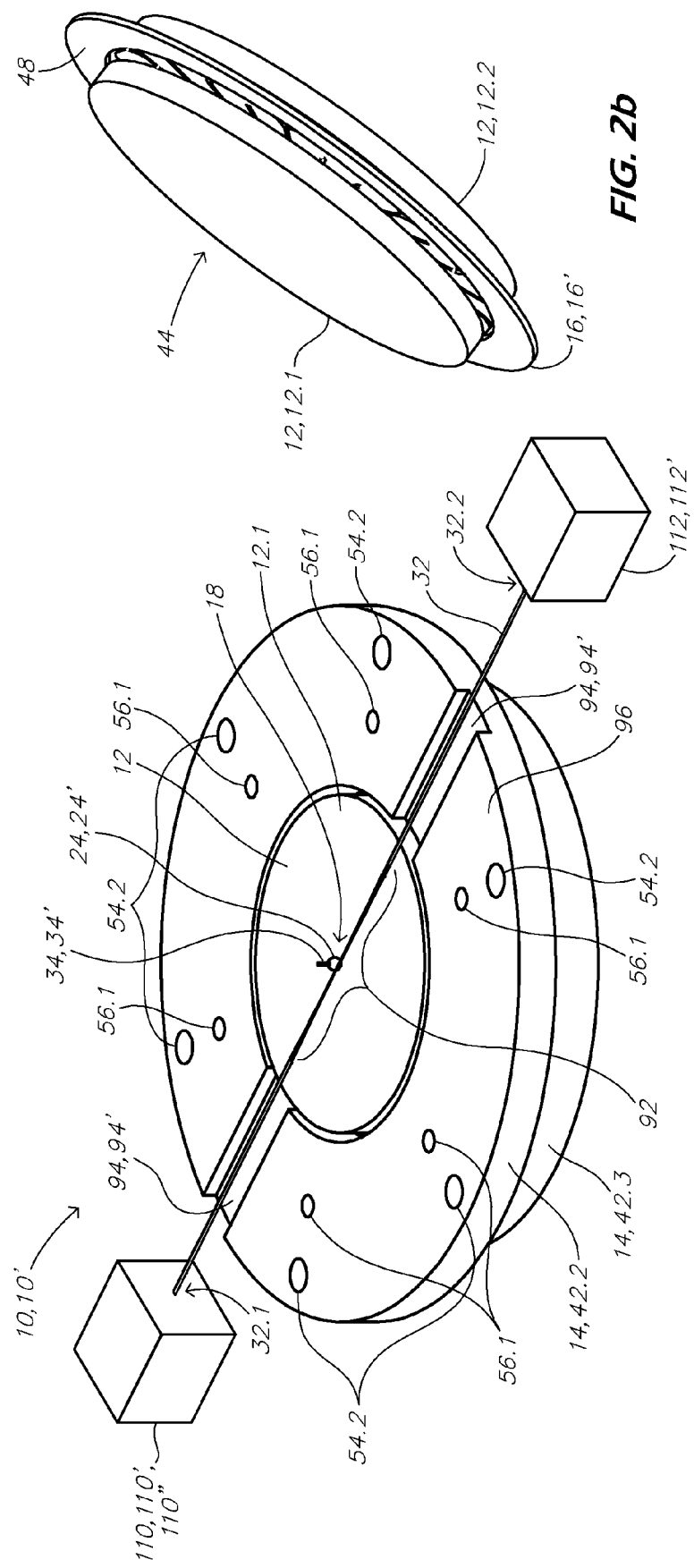

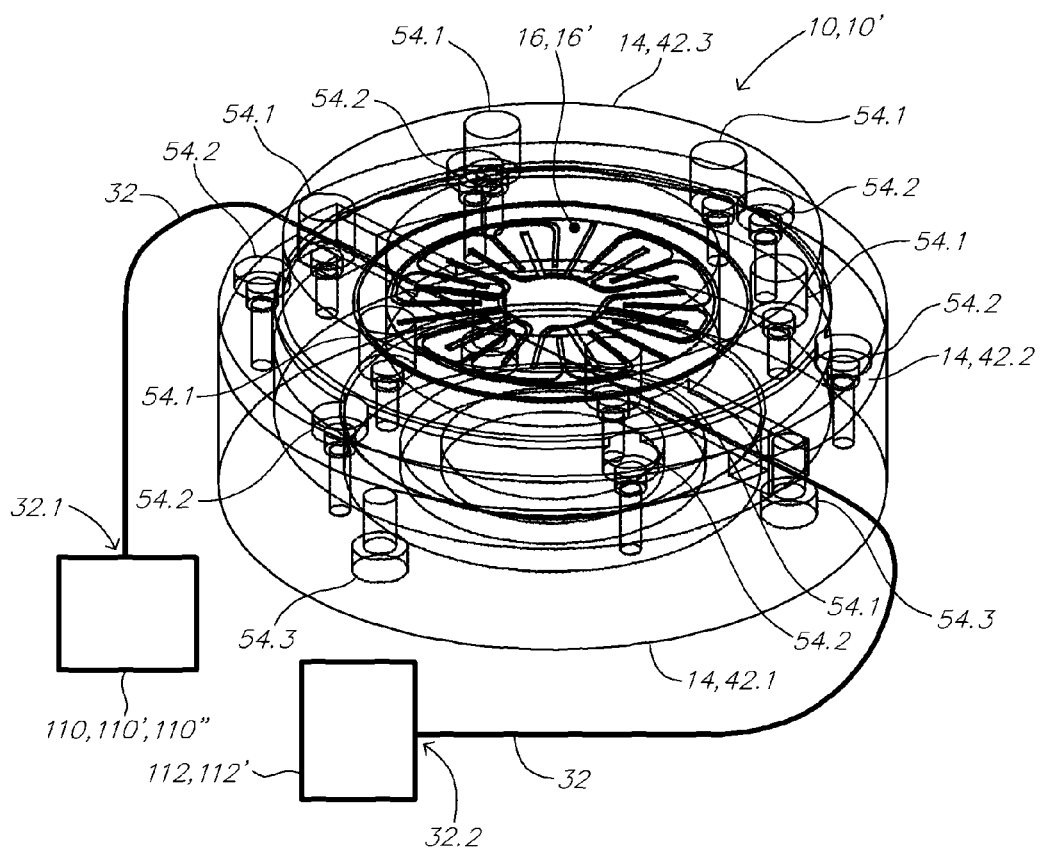
FIG. 3a
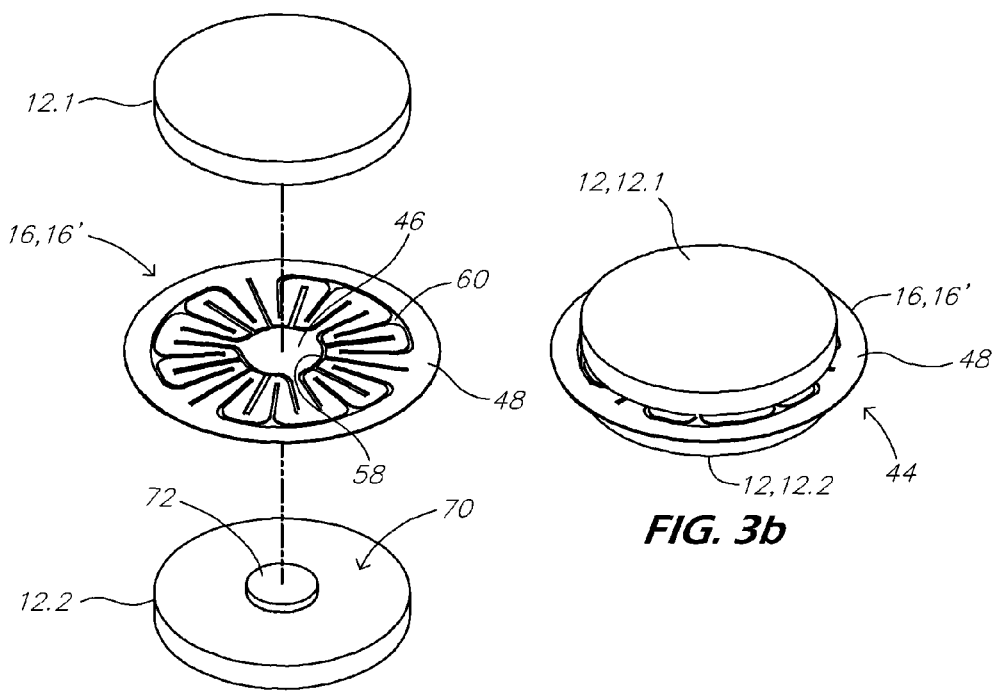
FIG. 3b
FIG. 3c

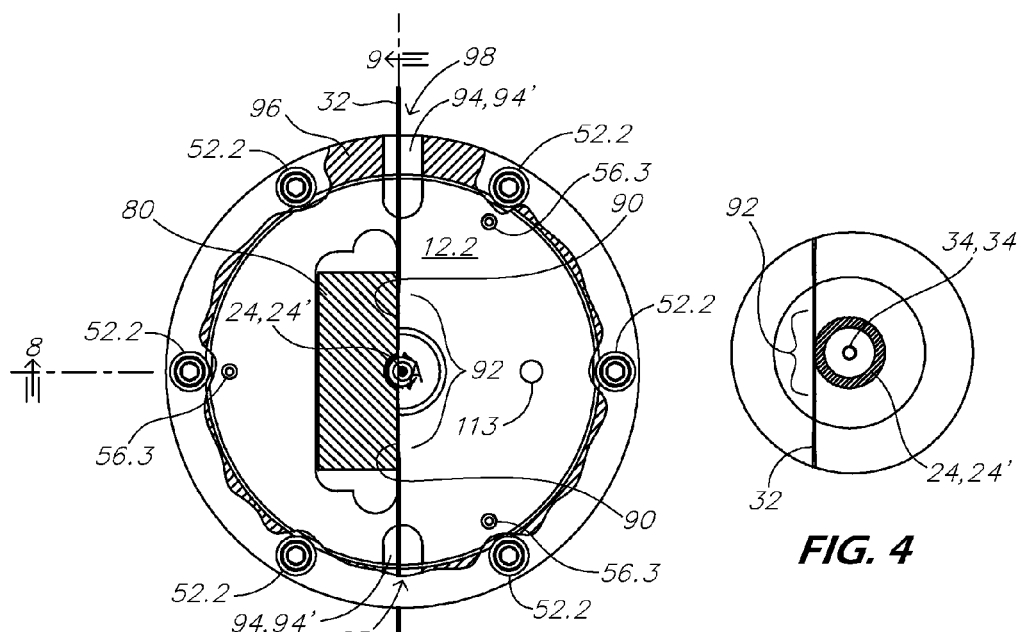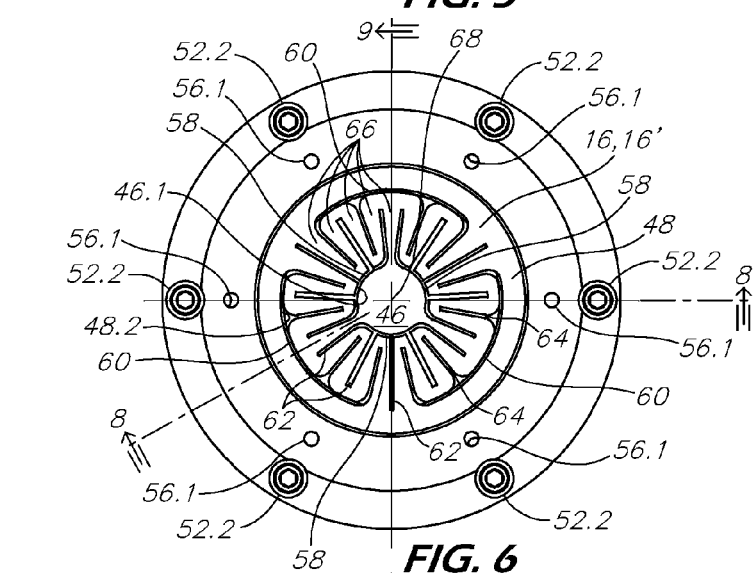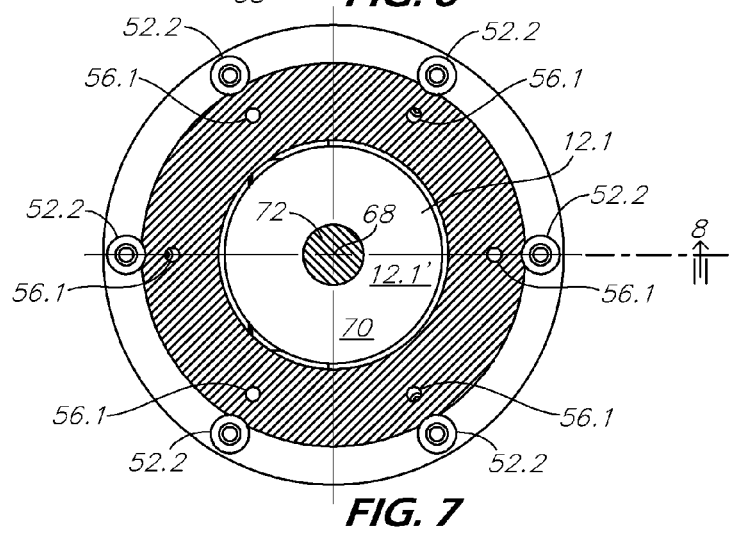

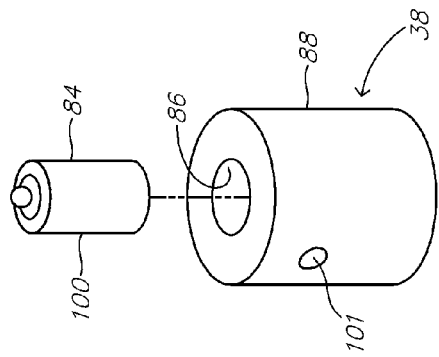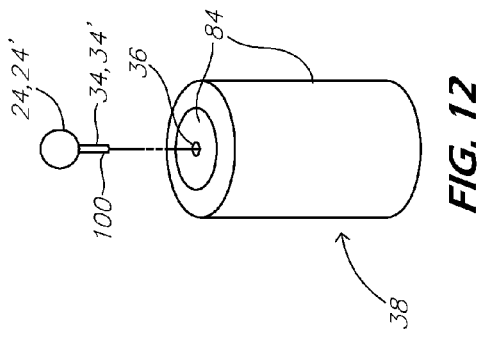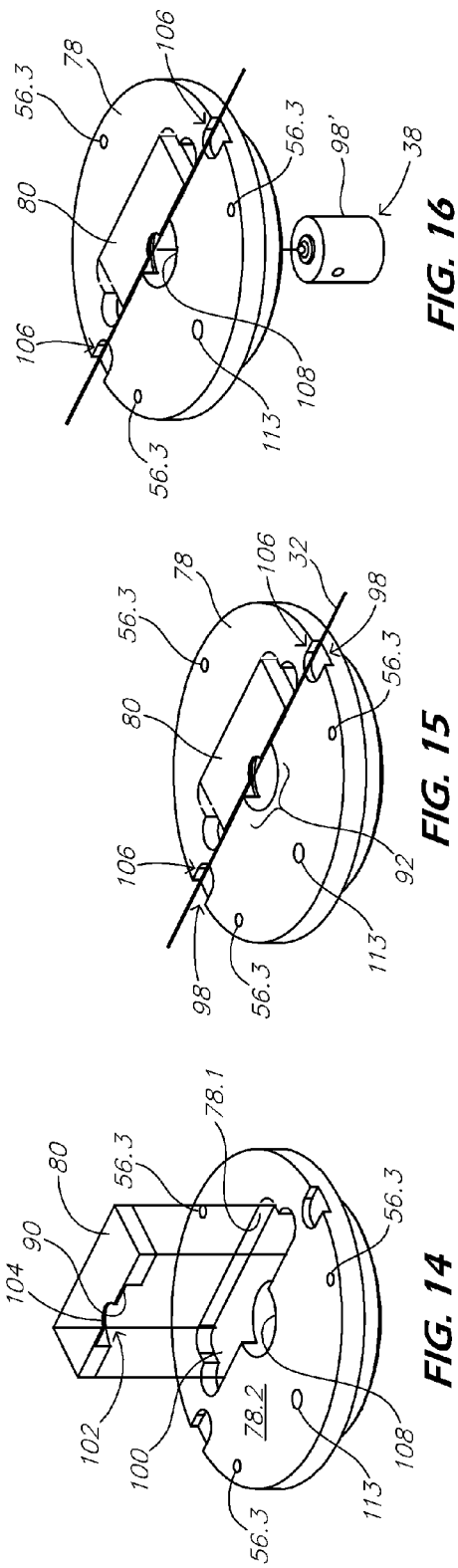

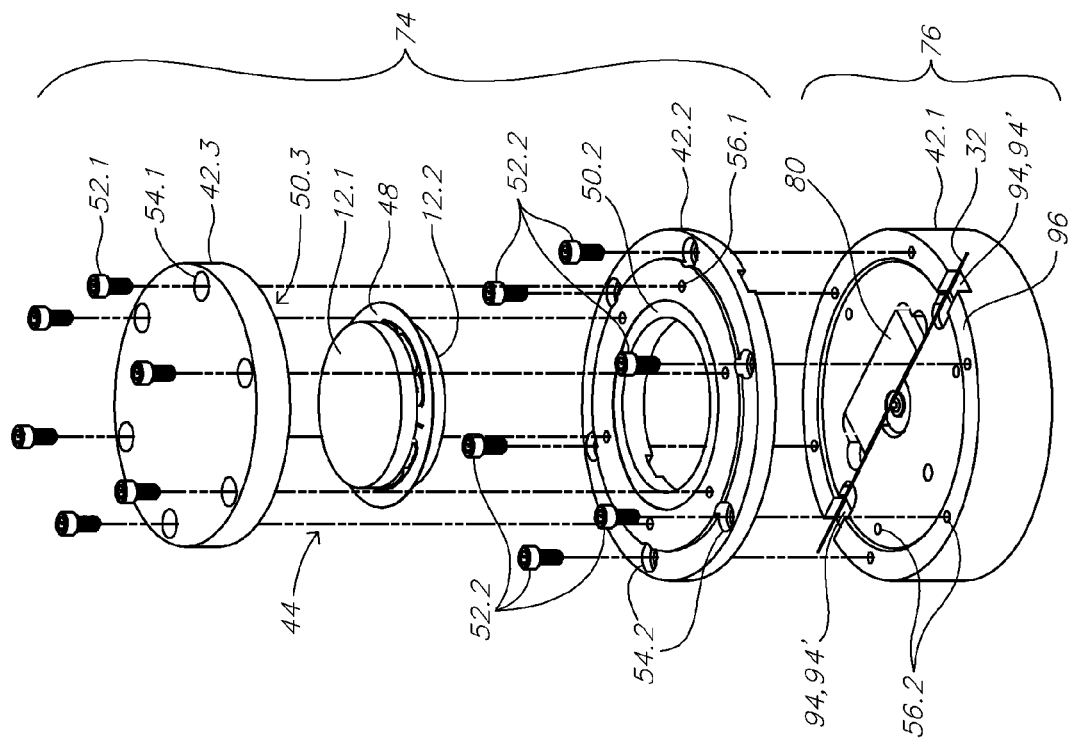
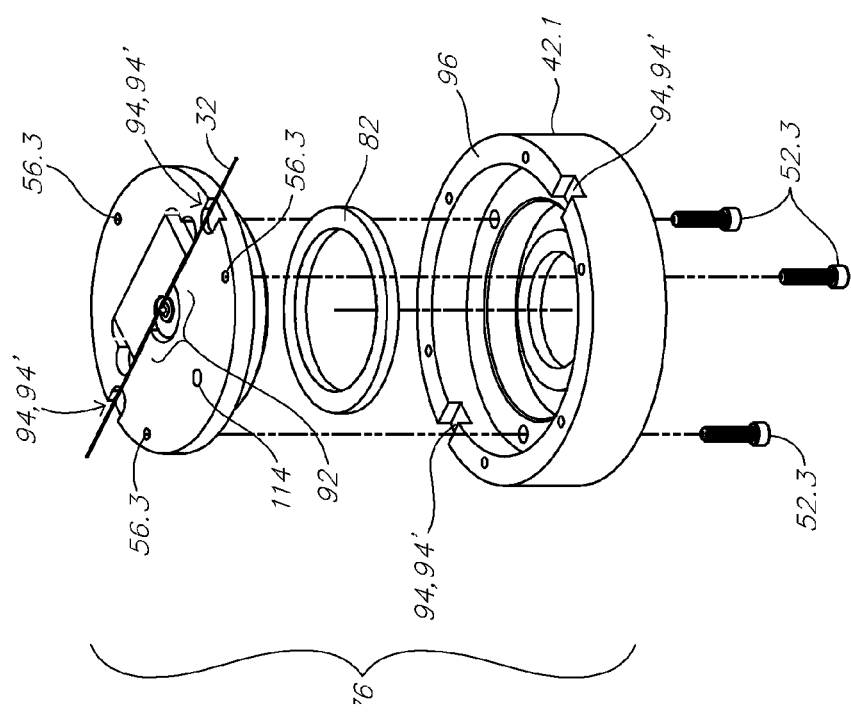

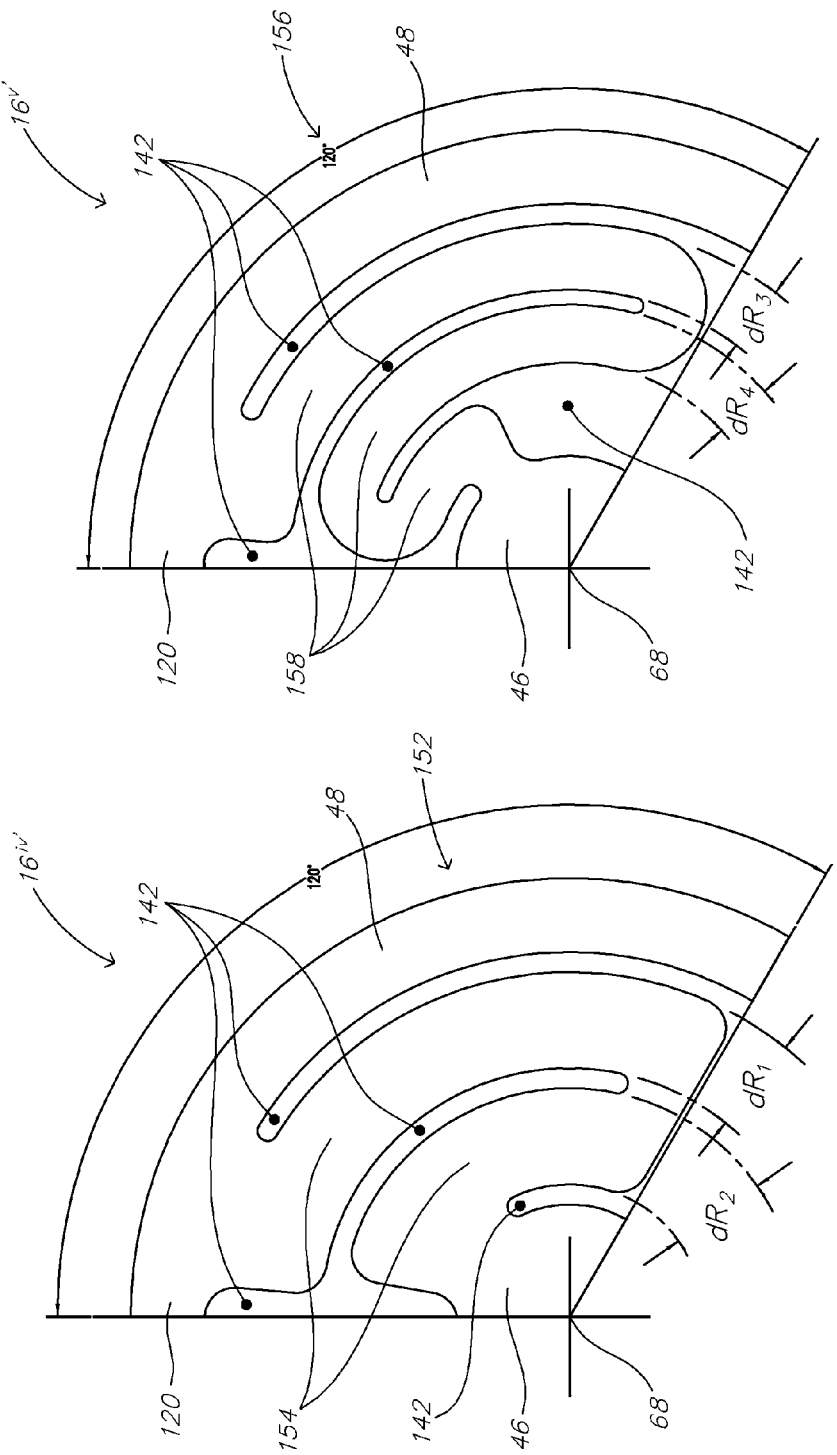

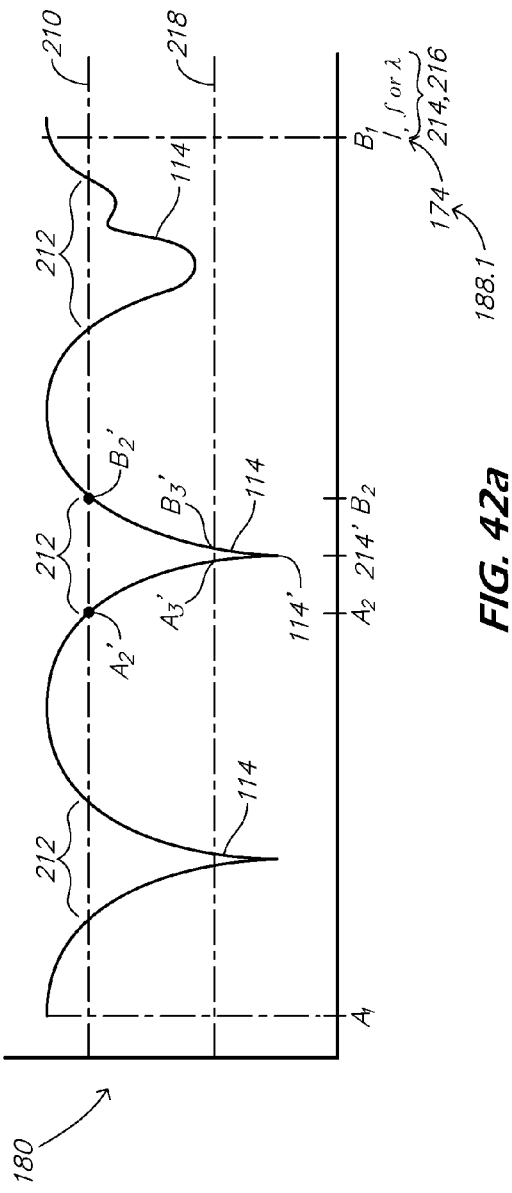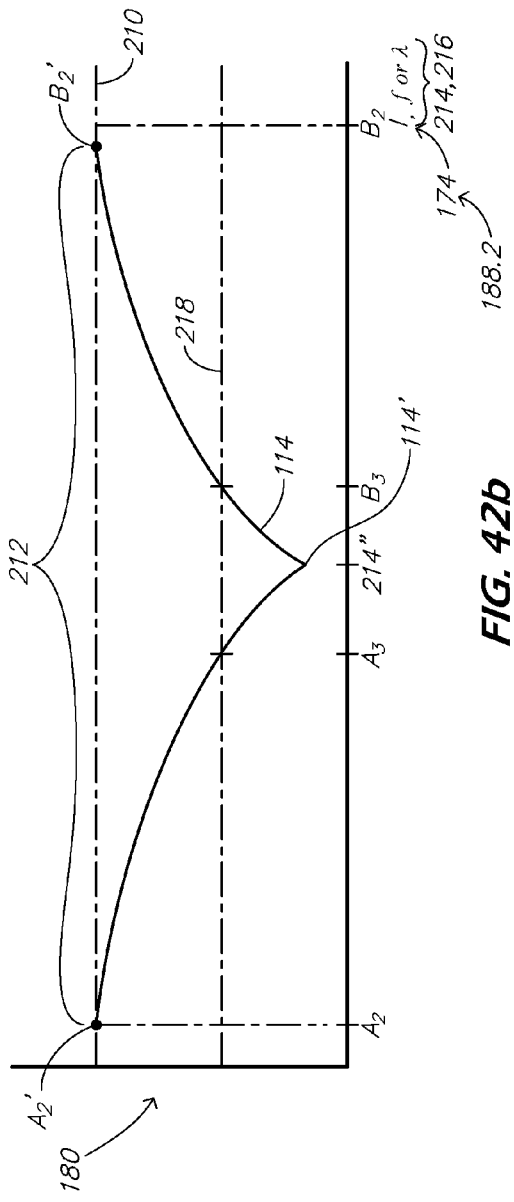

WHISPERING-GALLERY-MODE-BASED SEISMOMETER

STATEMENT REGARDING FEDERALLY SPONSORED RESEARCH OR DEVELOPMENT

This invention was made with Government support under Contract Nos. DE-FG02-08ER85099 and DE-FG02-08ER85099 MOD 0001 awarded by the U.S. Department of Energy. The Government has certain rights in the invention.

CROSS-REFERENCE TO RELATED APPLICATIONS

The instant application claims the benefit of prior U.S. Provisional Application Ser. No. 61/380,176 filed on 3 Sep. 2010, which is incorporated by reference herein in its entirety.

BRIEF DESCRIPTION OF THE DRAWINGS

FIG. 2a illustrates an isometric view of a sensing element of a whispering-gallery-mode-based seismometer in cooperation with both an inertial-reference subassembly and an associated optical fiber, the latter in cooperation with an associated detection system;

FIG. 2b illustrates an isometric view of spring-mass subassembly of the inertial-reference subassembly illustrated in FIG. 2a;

FIG. 3a illustrates a see-through isometric view through first and second housing portions of the inertial-reference subassembly of a whispering-gallery-mode-based seismometer, attached to a third housing portion of an associated sensor subassembly, showing an associated spring element through both the transparent first housing portion and a transparent first proof-mass element, with the optical fiber of the sensor subassembly operatively coupled to an associated detection system;

FIG. 3b illustrates a spring-mass subassembly of the inertial-reference subassembly illustrated in FIGS. 2a and 3a;

FIG. 3c illustrates an exploded view to the spring-mass subassembly illustrated in FIG. 3b.

FIG. 4 illustrates a first transverse cross-sectional view through the sensing element illustrated in FIG. 2a along a plane parallel to the associated spring-mass subassembly and cutting through both the associated sensing element comprising a micro-optical resonator and the optical fiber in cooperation therewith;

FIG. 5 illustrates a fragmentary view of a portion of the second housing portion of the inertial-reference subassembly and a fragmentary second transverse cross-sectional view through sensor subassembly and the sensing element illustrated in FIGS. 2a and 4 along a plane parallel to the associated spring-mass subassembly;

FIG. 6 illustrates a third transverse cross-sectional view through the inertial-reference subassembly illustrated in FIGS. 2a and 3a along a plane parallel to and just above the associated spring element;

FIG. 7 illustrates a fourth transverse cross-sectional view through the second housing portion of the inertial-reference subassembly along a plane parallel to and below the associated spring element through a central stub portion of an associated second proof-mass element;

FIG. 12 illustrates a process of assembling a stub-coupled micro-optical resonator to a ferrule of the micro-optical resonator support subassembly;

FIG. 13 illustrates a process of assembling the subassembly illustrated in FIG. 12 to a collar of the micro-optical resonator support subassembly;

FIG. 14 illustrates a process of assembling an optical fiber support to a sensing element support platform of the sensor subassembly;

FIG. 15 illustrates a process of assembling the optical fiber to the optical fiber support of the subassembly illustrated in FIG. 14;

FIG. 16 illustrates a process of assembling the micro-optical resonator support subassembly illustrated in FIG. 13 to the subassembly illustrated in FIG. 15;

FIG. 17 illustrates a process of assembling the subassembly illustrated in FIG. 16 and a wave spring with the third housing portion of the sensor subassembly;

FIG. 18 illustrates a process of assembling the inertial-reference subassembly and the associated whispering-gallery-mode-based seismometer;

FIG. 35 illustrates a plan view of fourth aspect of a spring element of a whispering-gallery-mode-based seismometer;

FIG. 36 illustrates a plan view of fifth aspect of a spring element of a whispering-gallery-mode-based seismometer;

FIG. 42a illustrates a signal from a photo-detector of an associated detection system during a relatively wide-range frequency scan of an associated tunable laser diode light source;

FIG. 42b illustrates a signal from the photo-detector of the associated detection system during a relatively narrow-range frequency scan of the associated tunable laser diode light source;

DESCRIPTION OF EMBODIMENT(S)

Figure 1:
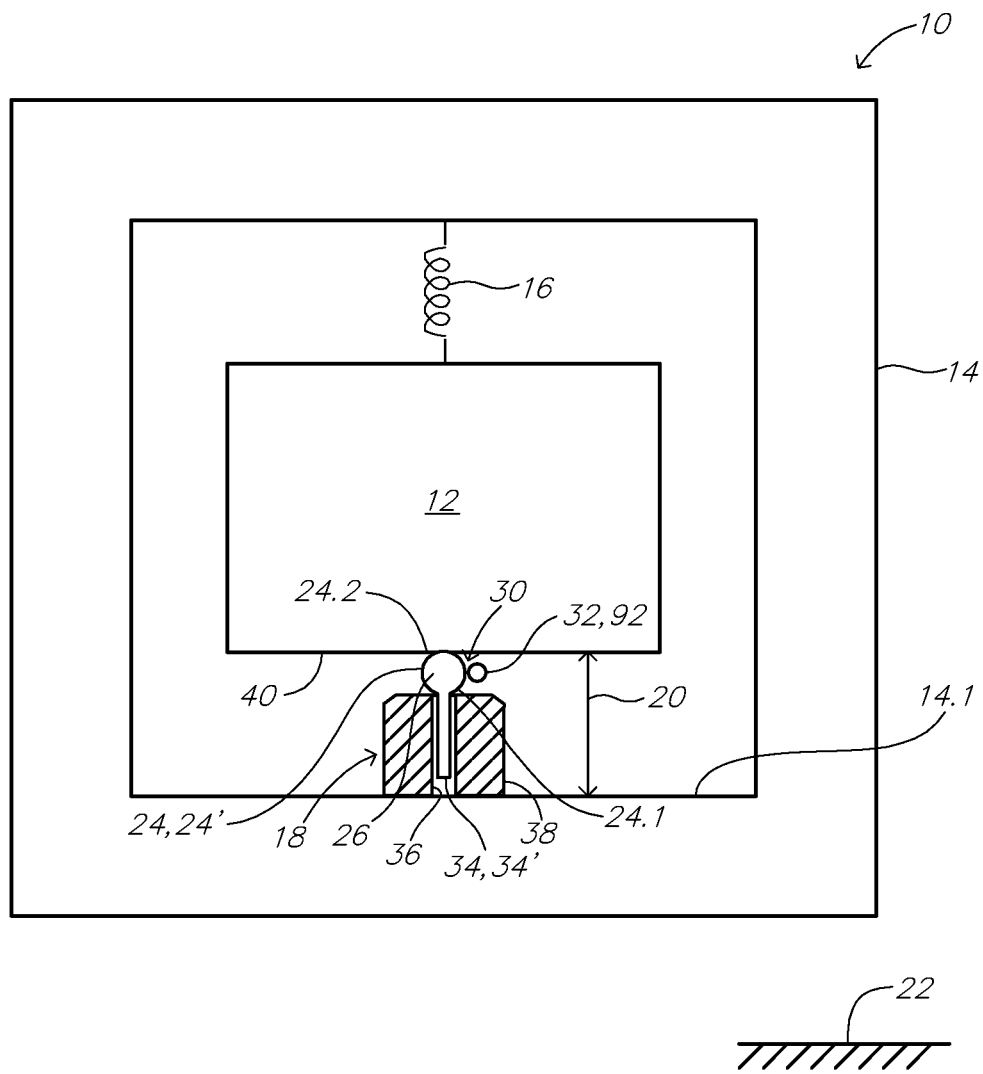
FIG. 1 illustrates a schematic view of a whispering-gallery-mode-based seismometer.
Figure 8:
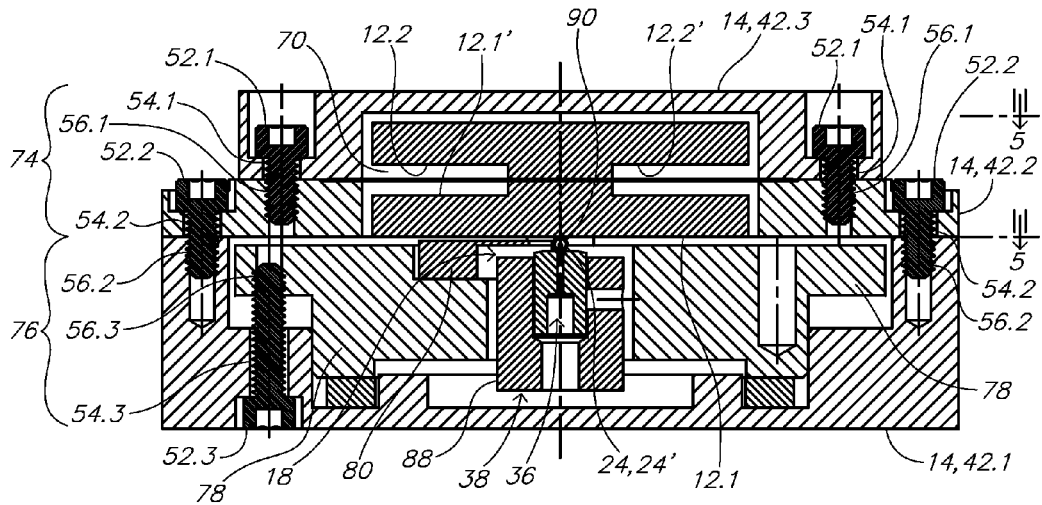
FIG. 8 illustrates a first axial cross-sectional view through the sensing element illustrated in FIGS. 2a and 5 along a plane transverse to the associated optical fiber.
Figure 9:
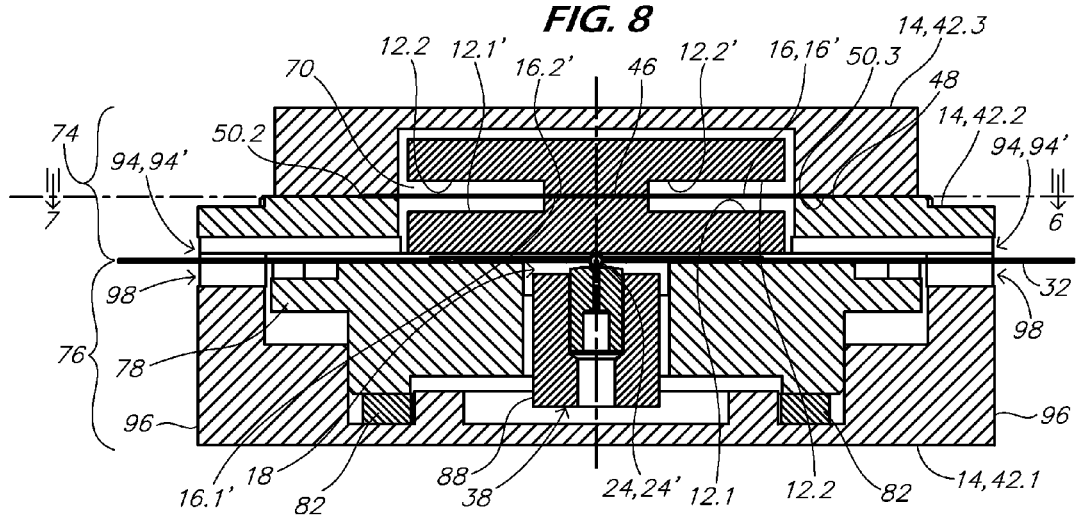
FIG. 9 illustrates a second axial cross-sectional view through the sensing element illustrated in FIGS. 2a and 5 along a plane through the center of the associated optical fiber.
Figure 10:
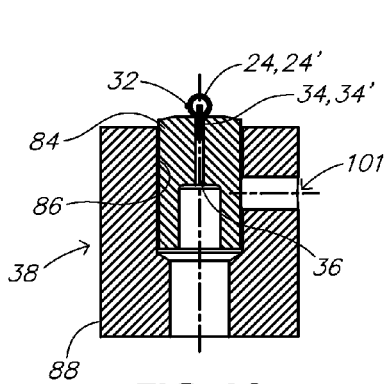
FIG. 10 illustrates an axial cross-sectional view through an associated micro-optical resonator support subassembly along a plane that is transverse to the optical fiber.
Figure 11:
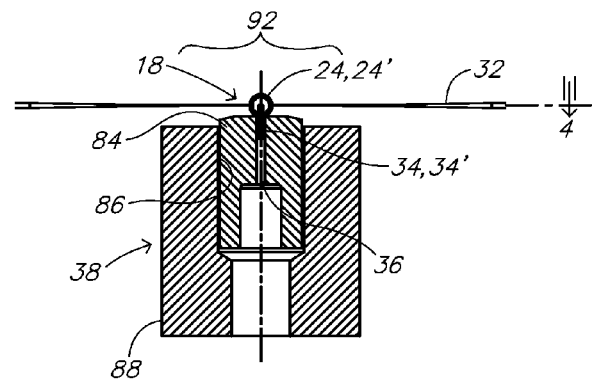
FIG. 11 illustrates an axial cross-sectional view through the micro-optical resonator support subassembly along a plane through and along the optical fiber.

Referring to FIG. 1, a whispering-gallery-mode-based seismometer 10 comprises a proof mass 12 suspended from a frame 14 with an associated spring 16 that provides for both enabling the frame 14 to move relative to the proof mass 12, and that provides for biasing the proof mass 12 against a sensing element 18 that provides for sensing a measure responsive to a distance 20 between the proof mass 12 and the frame 14.

In accordance with Newton's first law of motion, a body will remain in a state of rest unless acted upon by an external net force. Accordingly, for a relatively stationary whispering-gallery-mode-based seismometer 10, e.g. relatively stationary relative to the earth, the proof mass 12 tends to remain located at a fixed location in inertial space, even if the frame 14 is moved relative thereto. For relatively small motions, a spring 16 with sufficient compliance will provide for the frame 14 to move relative to the proof mass 12 without more than insubstantially perturbing the stationary position of the proof mass 12 with respect to its inertial frame of reference 22, so that the distance 20 between the proof mass 12 and the frame 14 as measured by the sensing element 18 can provide a measure of the motion of the frame 14 relative to the inertial frame of reference 22 of the proof mass 12, which is also the inertial frame of reference 22 for the environment of the whispering-gallery-mode-based seismometer 10 that is subject to the motions being measured thereby. Accordingly, the whispering-gallery-mode-based seismometer 10 provides for measuring motions of the frame 14 thereof relative to an associated inertial frame of reference 22.

The sensing element 18 of the whispering-gallery-mode-based seismometer 10 comprises a micro-optical resonator 24, for example, comprising at least a portion a transparent hollow spherical dielectric element 24', i.e. what is referred to as a microsphere 24', that is capable of supporting whispering-gallery modes 26 of resonance of light 28 propagating by total internal reflection within the micro-optical resonator 24 and that is coupled thereinto by evanescent waves 30 from an adjacent optical fiber 32, wherein, as will be described more fully hereinbelow, the resonant frequency of a particular whispering-gallery mode 26 is responsive to the shape of the micro-optical resonator 24. The morphological deformation of the hollow dielectric microsphere 24' under compression shifts the naturally occurring optical resonances thereof, in proportion to the amount of physical deformation. The Q-factor of these optical resonances is on the order of $10^7$, which provides for detecting acceleration as small as nano-g's, or forces on the order of nano-Newtons. Generally, the sensitivity of the microsphere 24' is inversely related to its diameter.

In accordance with one aspect, the micro-optical resonator 24 comprises a hollow polymer microsphere 24', for example, constructed of PDMS, i.e. poly(dimethylsiloxane), with curing agent ratios ranging from 10:1 to 60:1. The curing agent ratio determines the hardness of the microsphere, 10:1 being the hardest. The microsphere diameter ranges from 1,500 micrometers down to 200 micrometers. Generally, the micro-optical resonator 24 can be constructed of a compliant dielectric material, examples of which include, but are not limited to, either poly(methyl methacrylate) (PMMA) or poly(dimethylsiloxane) (PDMS).

In one embodiment, the microsphere 24' is either bonded to, or formed on the end of, a short fiber stub 34, for example, a short stub of multimode fiber 34', that is inserted into an axial hole 36 in a micro-optical resonator support subassembly 38 operatively coupled to an inner surface 14.1 of the frame 14 so as to provide for supporting a first side 24.1 of the microsphere 24' from the inner surface 14.1 of the frame 14 and transversely locating the microsphere 24' relative to both the frame 14 and the proof mass 12. Alternatively, the microsphere 24' could be positioned on a chamfered surface of the micro-optical resonator support subassembly 38 with or without the aid of the short fiber stub 34.

The spring 16 provides for biasing an outer surface 40 of the proof mass 12 against a second side 24.2 of the micro-optical resonator 24, so that changes in distance 20 between the proof mass 12 and the frame 14 provide for changing the distance between the outer surface 40 of the proof mass 12 and the inner surface 14.1 of the frame 14, which provides for changing the shape of the micro-optical resonator 24 responsive to the resulting compression of the micro-optical resonator 24 therebetween, wherein changes in the shape of the micro-optical resonator 24 provide for corresponding changes in the optical resonant frequency of the associated whispering-gallery mode 26. Accordingly, the optical resonant frequency of the associated whispering-gallery mode 26 is responsive to the distance 20 between the proof mass 12 and the frame 14. Accordingly, this distance 20 can be measured by measuring the optical resonant frequency of the micro-optical resonator 24, or a measure responsive thereto, so as to provide for optically measuring the motion of the frame 14 relative to the proof mass 12, or equivalently, relative to the inertial frame of reference 22, as will be described more fully herein below.

The spring 16 is made sufficiently compliant so as to effectively mechanically isolate the proof mass 12 from the frame 14 with respect to small-amplitude vibrations of the frame 14, yet is sufficiently stiff so as to provide for biasing the proof mass 12 against the micro-optical resonator 24 for associated vibration frequencies within the operating bandwidth of the whispering-gallery-mode-based seismometer 10. Furthermore, the micro-optical resonator 24 is sufficiently compliant over the range of motion to be measured so as to not substantially affect the isolation of the proof mass 12 relative to the frame 14 with respect to small-amplitude vibrations of the frame 14.

Referring to FIGS. 2*a-b*, 3*a-c* and 4-18, illustrating a single-axis whispering-gallery-mode-based seismometer 10', the associated frame 14 comprises an assembly of first 42.1, second 42.2 and third 42.3 housing portions that are each internally hollowed so as to provide space for a spring-mass subassembly 44 comprising the first 12.1 and second 12.2 proof mass elements that collectively constitute the proof mass 12 of the whispering-gallery-mode-based seismometer 10 and that are bonded to opposite sides of a central portion 46 of a circular leaf spring 16', a peripheral portion 48 of which is clamped between corresponding annular faces 50.2, 50.3 of the second 42.2 and third 42.3 housing portions, for example, by a plurality of first screw fasteners 52.1, e.g. six first screw fasteners 52.1, extending through corresponding first clearance holes 54.1 in the third housing portion 42.3 and into corresponding first threaded holes 56.1 in the second housing portion 42.2.

Referring to FIGS. 3*a*, 3*c* and 6, the circular leaf spring 16' comprises a plurality of inner 58 and outer 60 circumferential slots that respectfully provide for delineating the outer boundary 46.1 of the central portion 46 and the inner boundary 48.2 of the peripheral portion 48. The circular leaf spring 16' further comprises a plurality of first radial slots 62 extending radially-outwards from the inner circumferential slots 58, and a plurality of second radial slots 64 extending radially-inwards from the outer circumferential slots 60 that together delineate a plurality of serpentine radial-circumferential leaf-spring portions 66 connecting the central 46 and peripheral 48 portions of the circular leaf spring 16', so as to provide for maintaining the central portion 46 substantially centered within the peripheral portion 48, and so as to provide for the central portion 46 to be deflected along a central axis 68 in a direction that is normal to the plane of the peripheral portion 48 that remains relatively fixed between the second 42.2 and third 42.3 housing portions.

The proof mass 12 comprises first 12.1 and second 12.2 proof mass elements, each of which is undercut along an annular region 70 on a first side 12.1', 12.2' of each corresponding proof mass element 12.1, 12.2 so as to form a corresponding central stub portion 72 on the first side 12.1', 12.2' of each corresponding proof mass element 12.1, 12.2 that is substantially the same diameter as the central portion 46 of the circular leaf spring 16'. The central stub portion 72 of the first side 12.1' of the first proof mass element 12.1 is bonded, e.g. adhesively bonded, to the central portion 46 of the circular leaf spring 16' on the first side 16.1' thereof, and the central stub portion 72 of the first side 12.2' of the second proof mass element 12.2 is bonded, e.g. adhesively bonded, to the central portion 46 of the circular leaf spring 16' on the second side 16.2' thereof. The undercut annular regions 70 on the first side 12.1', 12.2' of each corresponding proof mass element 12.1, 12.2 are sufficiently undercut so as provide for clearance from the remaining portion of the circular leaf spring 16' during operation thereof. Otherwise, the first 12.1 and second 12.2 proof mass elements are made relatively broad and thin so as to occupy a relatively minimal amount of space within the hollow interiors of the second 42.2 and third 42.3 housing portions so as to provide for a relatively compact whispering-gallery-mode-based seismometer 10 for a given level of performance.

For example, in one embodiment, substantially identical first 12.1 and second 12.2 proof mass elements were each constructed of tungsten with an outside diameter of about 18 millimeters, having a combined mass of about 10 grams, in cooperation with a circular leaf spring 16' having and outside diameter of about 22 millimeters, with the spring-mass subassembly 44 having a resonant frequency of up to about 80 Hertz that provides for an associated operating bandwidth of up to at least 40 Hertz that can be packaged in a volume less than about 80 cm$^3$.

Alternatively, the proof mass 12 need not incorporate both first 12.1 and second 12.2 proof mass elements, but instead could be constituted of either the first proof mass element 12.1 or the second proof mass element 12.2 alone.

Generally, the single-axis whispering-gallery-mode-based seismometer 10' illustrated in FIGS. 2*a-b*, 3*a-c* and 4-18 comprises an inertial-reference subassembly 74 operatively coupled to a corresponding sensor subassembly 76, each of which can be separately assembled, wherein the inertial-reference subassembly 74 comprises the spring-mass subassembly 44 clamped by the plurality of first screw fasteners 52.1 between the second 42.2 and third 42.3 housing portions, and the sensor subassembly 76 comprises the sensing element 18 operatively coupled to the first housing portion 42.1. The inertial-reference 74 and sensor 76 subassemblies are assembled together so as to provide for the micro-optical resonator 24, 24' of the sensing element 18 to interact with the proof mass 12 of the spring-mass subassembly 44, for example, by assembling the second housing portion 42.2 of the inertial-reference subassembly 74 to the first housing portion 42.1 of the sensor subassembly 76 with a plurality of second screw fasteners 52.2, e.g. six second screw fasteners 52.2, extending through corresponding second clearance holes 54.2 in the second housing portion 42.2 and into corresponding second threaded holes 56.2 in the first housing portion 42.1.

Referring to FIGS. 8-16, the sensor subassembly 76 comprises the micro-optical resonator 24, 24' supported from a micro-optical resonator support subassembly 38, which is in turn supported from a sensing element support platform 78 that also supports a corresponding optical fiber support 80, that is supported from the first housing portion 42.1 by a wave spring 82 interposed therebetween, and that is operatively connected to the first housing portion 42.1 with a plurality of third screw fasteners 52.3, e.g. three third screw fasteners 52.3, extending through corresponding third clearance holes 54.3 in the first housing portion 42.1 and into corresponding third threaded holes 56.3 in the sensing element support platform 78.

The micro-optical resonator support subassembly 38 comprises a ferrule 84 located within an axial bore 86 of an associated collar 88, the former of which incorporates the axial hole 36 into which is inserted the short fiber stub 34, 34' operatively coupled to the micro-optical resonator 24, 24' that together provide for transversely locating the micro-optical resonator 24, 24' portion of the sensing element 18 relative to the proof mass 12 of the spring-mass subassembly 44.

The optical fiber 32 portion of the sensing element 18 is operatively coupled to an edge portion 90 of the optical fiber support 80, and the relative position of the micro-optical resonator support subassembly 38 relative to the optical fiber support 80 is adjusted as described more fully hereinbelow so as to provide for locating a relatively thinned portion 92 of the optical fiber 32 substantially tangent and parallel to a diametrical plane of the microsphere 24' micro-optical resonator 24, 24' in a plane substantially normal to the central axis 68 along which the spring-mass subassembly 44 is free to move, and sufficiently close to the micro-optical resonator 24, 24' so as to provide for evanescent coupling of light 28 from the optical fiber 32 to the micro-optical resonator 24, 24', and so that the resulting whispering-gallery modes 26 of internally reflected light within the microsphere 24' micro-optical resonator 24, 24' interact with a great-circle portion of the microsphere 24' micro-optical resonator 24, 24' that remains substantially circular responsive to deformation thereof during operation thereof. For example, in one set of embodiments, locating the relatively thinned portion 92 of the optical fiber 32 within about 500 nanometers of the micro-optical resonator 24, 24' provides for sufficient evanescent coupling of light 28 into the micro-optical resonator 24, 24'. This distance is generally independent of the sizes of the optical fiber 32 and micro-optical resonator 24, 24', but may depend upon the wavelength λ, of the light 28 of the evanescent waves 30.

Referring to FIGS. 2a, 2a, 5 9 and 14-18, the optical fiber 32 extends through openings 94, for example, slots 94' or holes, in an edge wall portion 96 of the first 42.1 and second 42.2 housing portions, for example, substantially diametrically opposed openings 94. The optical fiber 32 is located between the openings 94 so as to position the relatively thinned portion 92 of the optical fiber 32 adjacent to the associated microsphere 24', after which, in one embodiment, the optical fiber 32 is held within the openings 94 using an adhesive sealant 98, for example, either epoxy or glue—for example, an ultraviolet (UV) cured adhesive.

Referring to FIGS. 12-17, in accordance with one embodiment, the sensor subassembly 76 may be assembled as follows: Referring to FIG. 12, the short fiber stub 34 of the micro-optical resonator 24, 24' is first inserted into the axial hole 36 of the ferrule 84 and glued thereto with an adhesive 100, for example, cyanoacrylate (super-glue). For example, the ferrule 84 may be of a design and construction as commonly used in fiber optic systems, for example, commercial telecommunications systems. Referring to FIG. 13, the ferrule 84 is inserted into the axial bore 86 of the collar 88 and glued thereto with an adhesive 100, for example, cyanoacrylate (super-glue), so as to complete the assembly of the associated micro-optical resonator support subassembly 38. Alternatively, or additionally, the ferrule 84 may be secured to the collar 88 using a setscrew within a radial threaded hole 101 in the collar 88. The collar 88 provides for interfacing a standard fiber-optic ferrule 84 to the sensing element support platform 78 in a manner that provides for adjusting the position of the micro-optical resonator 24, 24' relative to the relatively thinned portion 92 of the optical fiber 32.

Referring to FIG. 14, the optical fiber support 80 is coupled—for example, adhesively bonded, for example, with an adhesive 100, for example, cyanoacrylate (super-glue)—to the sensing element support platform 78 within a recessed portion 78.1—for example, formed by milling—of the sensing element support platform 78. The thickness (height) of the optical fiber support 80 is slightly greater than the depth of the recessed portion 78.1 so as to provide for the edge portion 90 of the optical fiber support 80 to extend above the top surface 78.2 of the sensing element support platform 78 by a sufficient amount to provide for laterally supporting and guiding the optical fiber 32 positioned thereagainst along a substantially straight path across the top surface 78.2 of the sensing element support platform 78. The optical fiber support 80 incorporates both an undercut 102 and a portion of a clearance hole 104 so as to provide for clearance around the micro-optical resonator 24, 24' and above the micro-optical resonator support subassembly 38 when the latter is assembled into the sensing element support platform 78. Alternatively, the sensing element support platform 78 could be formed or milled with the operative features of the optical fiber support 80 without requiring a separate optical fiber support 80 adhesively bonded thereto. Referring to FIG. 15, the optical fiber 32 is then attached to both the edge portion 90 of the optical fiber support 80 and to the top surface 78.2 of the sensing element support platform 78 with an adhesive 98'—for example, an ultraviolet (UV) cured adhesive—and a strain-relief jacket 106 is placed over the portions of the optical fiber 32 at the openings 94 in the edge wall 96 and bonded to the sensing element support platform 78, for example, with an adhesive 98', for example, an ultraviolet (UV) cured adhesive.

Referring to FIG. 16, the micro-optical resonator support subassembly 38 is then inserted in an axial bore 108 in the sensing element support platform 78, the inside diameter of which provides for a sliding fit with the outside diameter of the collar 88 of the micro-optical resonator support subassembly 38. The axial position of the micro-optical resonator support subassembly 38 within the axial bore 108 is adjusted so as to substantially maximize the evanescent coupling of light 28 from the relatively thinned portion 92 of the optical fiber 32 into the micro-optical resonator 24, 24', with the light 28 supplied to one end 32.1 of the optical fiber 32 with a laser light source 110, and detected from the other end 32.2 of the optical fiber 32 with a corresponding photo-detector 112. After achieving sufficient evanescent coupling, the micro-optical resonator support subassembly 38 is then bonded to the axial bore 108 with an adhesive 98'—for example, an ultraviolet (UV) cured adhesive. During this process, a threaded hole 113 in the sensing element support platform 78 provides for fastening the sensing element support platform 78 to an associated alignment fixture (not illustrated).

Referring to FIG. 17, the resulting sensing element support platform 78 subassembly is then assembled to the first housing portion 14.1—with the wave spring 82 sandwiched therebetween—using the plurality of third screw fasteners 52.3 that also provide for adjusting the axial position of the sensing element support platform 78—and the resulting associated preload of the micro-optical resonator 24, 24' operatively coupled thereto—relative to the inertial-reference subassembly 74 upon final assembly thereof with the sensor subassembly 76 as described hereinabove.

Figure 19:
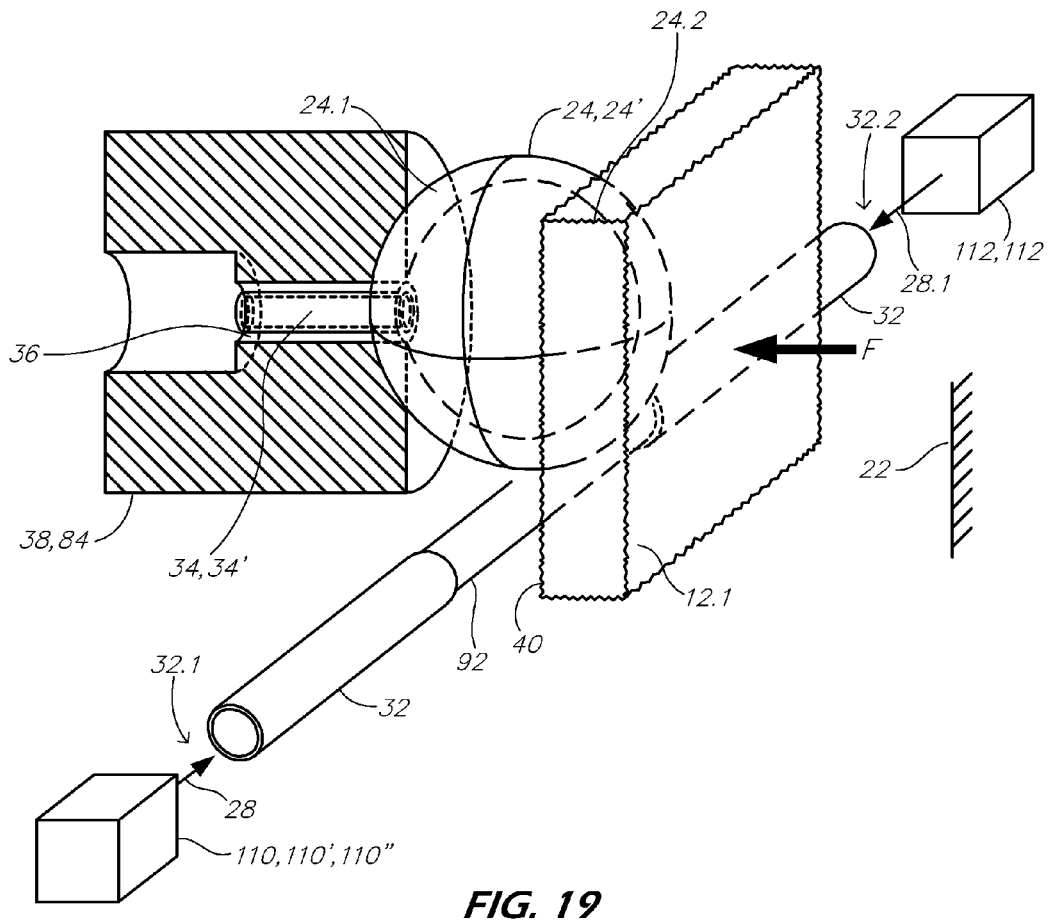
FIG. 19 illustrates the operation of the stub-coupled micro-optical resonator in cooperation with the associated ferrule of the micro-optical resonator support subassembly, the proof-mass of the spring-mass subassembly, the associated optical fiber and the associated detection system.
Figure 20:
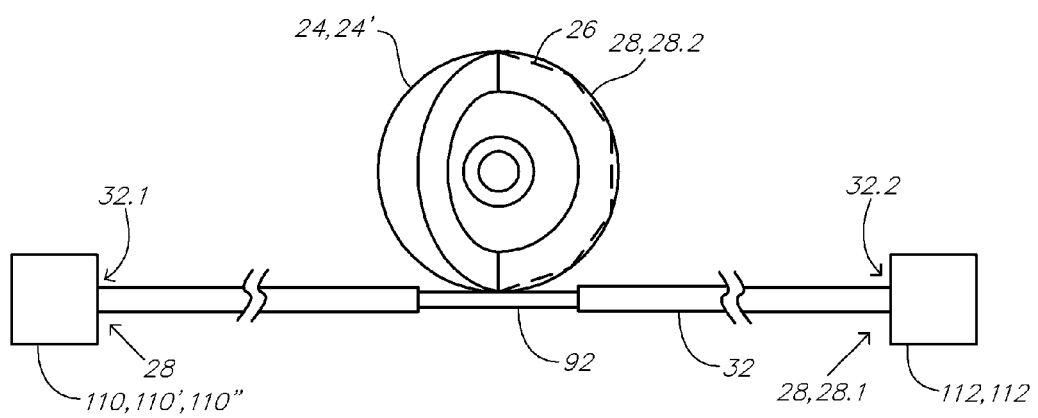
FIG. 20 illustrates the operation of the micro-optical resonator in cooperation with the associated optical fiber, and an associated whispering gallery mode within the micro-optical resonator.

Referring to FIGS. 19 and 20, light, with vacuum wavelength λ, can be launched tangentially into a dielectric microsphere 24' of radius $r_o$ and refractive index n through evanescent wave coupling, for example using a single-mode optical fiber 32 adjacent to an equatorial region of the microsphere 24' and weakly coupled thereto. In accordance with one aspect, illustrated in FIGS. 19 and 20, the cladding of the relatively thinned portion 92 of the optical fiber 32 that is to be either in contact with or close to the microsphere 24' is removed. In accordance with another aspect, illustrated in FIGS. 2a, 5, 9 and 11, the relatively thinned portion 92 of the optical fiber 32 that is to be in contact with or close to the microsphere 24' is tapered by heating and stretching it—for example, to a diameter of about 8 micrometers—so that its evanescent field is exposed. In accordance with one aspect, the optical fiber 32 is glued to the microsphere 24'.

Referring also to FIGS. 19 and 20, a first end 32.1 of the optical fiber 32 receives light 28 from a tunable laser light source 110', for example, a tunable laser diode light source 110", propagates a first portion of light 28.1 to a corresponding photo-detector 112—for example, a photo-diode 112'—at the second end 32.2 of the optical fiber 32, and propagates a second portion of light 28.2 to the microsphere 24' by evanescent coupling therewith at the relatively thinned portion 92 of the optical fiber 32 so as to provide for exciting associated whispering-gallery modes 26 of resonance of the second portion of light 28.2 within the microsphere 24', wherein the amount of the second portion of light 28.2 coupled into the microsphere 24' is dependent upon the frequency of the light 28, and is substantially increased at frequencies corresponding to frequencies of the associated whispering-gallery modes 26, resulting in corresponding nulls or dips 114 in the corresponding first portion of light 28.1 detected by the photo-detector 112—or, alternatively, a corresponding peak of an associated inverted signal. Accordingly, by scanning the frequency of the tunable laser light source 110', the optical resonant frequencies $v_0$ of the associated whispering-gallery modes 26 can be identified from nulls or dips 114 in the first portion of light 28.1 detected by the photo-detector 112, wherein the deformation of the microsphere 24' responsive to vibrations of the frame 14 of the whispering-gallery-mode-based seismometer 10 can then be detected from changes in the associated optical resonant frequencies $v_0$ of the whispering-gallery modes 26 as detected by the photo-detector 112 from the nulls or dips 114 in the corresponding first portion of light 28.1 transmitted thereto.

Generally, the microsphere 24', the associated optical fiber 32, tunable laser light source 110 and photo-detector 112 could be constructed and operated in accordance with any of the following teachings that are each incorporated herein by reference in their entirety: U.S. Pat. No. 7,491,491 B2 to Steven Arnold and Iwao Teraoka that issued on Feb. 17, 2009, entitled DETECTING AND/OR MEASURING A SUBSTANCE BASED ON A RESONANCE SHIFT OF PHOTONS ORBITING WITHIN A MICROSPHERE; U.S. Pat. No. 7,701,586 B2 to Volkan Otugen and Valery Sheverev that issued on Apr. 20, 2010, entitled MICRO-OPTICAL WALL SHEAR STRESS SENSOR; and Tindaro Ioppolo, Michael Kozhevnikov, Vadim Stepaniuk, M. Volkan Otugen and Valery Sheverev, "Micro-optical force sensor concept based on whispering gallery mode resonators," APPLIED OPTICS, Vol. 47, No. 16, 1 Jun. 1008, pp. 3009-3014.

In the geometric optics limit, the whispering-gallery modes 26 in a microsphere 24' are associated with optical ray paths such as the one shown in FIG. 20. When the refractive index of the microsphere 24' is larger than that of its surroundings, light 28.2 circles the interior thereof through total internal reflection and, at resonance 114', returns in phase. The condition for optical resonance (or a whispering-gallery mode 26) is $2\pi r_0 n = l\lambda$, where l is an integer and a measure of the ratio of the roundtrip path to the wavelength $\lambda$, $r_0$ is the nominal equatorial radius of the microsphere 24', and n is the index of refraction of the material of the microsphere 24'. In terms of frequency v, this condition is $v=(c/2\pi r_0 n)l$, where c is the speed of light 28 in a vacuum. The first order approximation of the shift in whispering-gallery modes 26 caused by a uniaxial force perturbation applied along the polar direction as shown in FIG. 19 is given by:

$$\frac{\Delta v}{v} = -\frac{\Delta r}{r} - \frac{\Delta n}{n} \tag{1}$$

The first term on the right-hand side represents the effect of strain as given by a fractional change in the equatorial radius $r_0$ of the microsphere 24' due to compression along the polar direction. The second term on the right is due to mechanical stress along the equatorial belt of the microsphere 24' and manifests itself as a fractional change of refractive index n.

Figure 21:
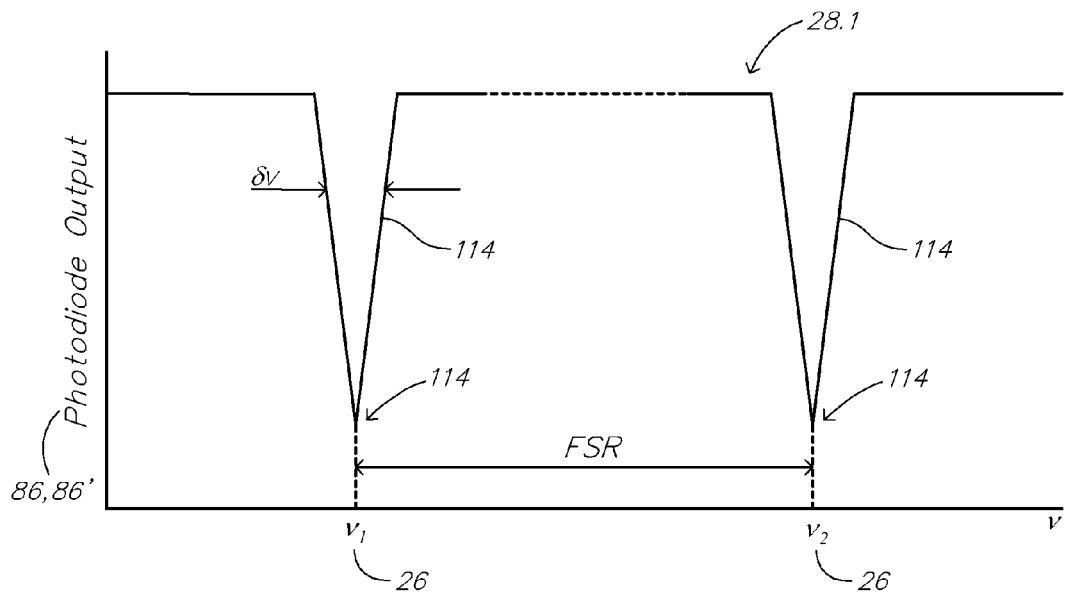
FIG. 21 illustrates the output of a photodetector receiving light from the optical fiber associated with the micro-optical resonator, wherein the frequency of light supplied to the optical fiber is scanned through the optical resonant frequency of the micro-optical resonator.

The whispering-gallery modes 26 are observed as relatively sharp nulls or dips 114 in the transmission spectrum of the light 28 through the optical fiber 32, as illustrated in FIG. 21. The observed line width $\delta v$, is related to the quality factor Q (or Q-factor), wherein $Q=v/\delta v$. The amount of energy loss as the light 28, 28.2 circulates inside the microsphere 24' decreases with increasing Q-factor, and approaches zero (i.e. no loss) as the Q-factor approaches infinity ($\infty$). The microsphere 24' exhibits an exceptionally large Q-factor that provides for realizing the full benefits of multiple photon circulation. For example, for the optical configuration illustrated in FIG. 20, for a microsphere 24' constructed of silica, Q-factors as large as to $10^8$ have been routinely observed by many researchers. Q-factors of approximately $10^7$ have been recently observed for microspheres 24' constructed of polymeric materials such as poly(methyl methacrylate) (PMMA) and poly(dimethylsiloxane) (PDMS).

For a given method of associated signal processing, the resulting resolution of an associated resonant frequency measurement is dependent upon the observed line width $\delta v$, which is dependent upon both the Q-factor of the microsphere 24' and the bandwidth of the light 28 from the associated tunable laser light source 110'.

Referring to FIG. 21, the frequency separation between two neighboring resonances is called the free spectral range FSR and is given by $$FSR = \frac{c}{2\pi n r_0} \tag{2}$$

The free spectral range FSR provides a measure of the associated measurement range. The associated dynamic range of measurement is responsive to the associated finesse $F_r$ given by the ratio $F_r=FSR/\delta v$. For example, for a microsphere 24' with $r_0=100$ $\mu$m, $Q=10^8$ and a laser wavelength of $\lambda \sim 0.6$ $\mu$m, $F_r \approx 60,000$. In comparison, for a typical planar Fabry-Perot arrangement, the associated finesse $F_r$ is typically less than 100.

Figure 22:
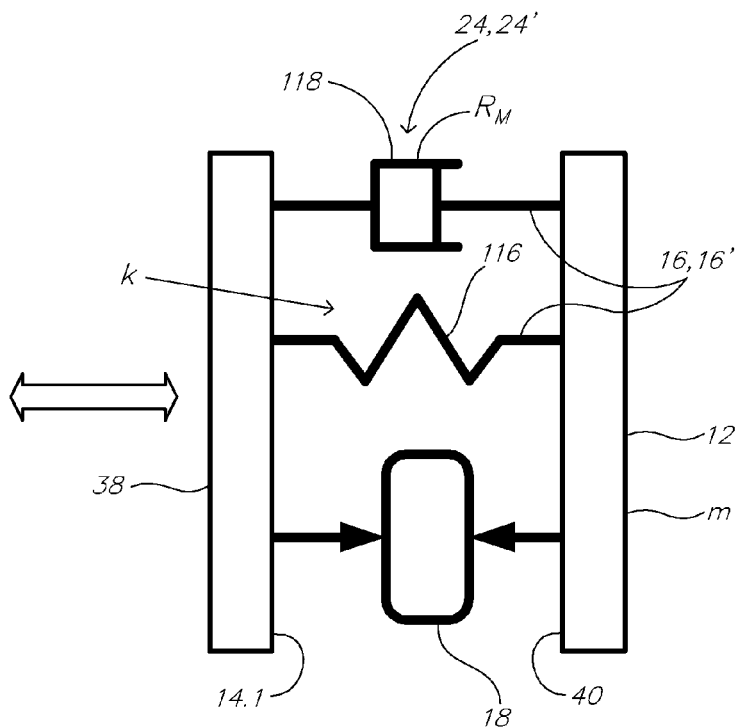
FIG. 22 illustrates a schematic mechanical model of the micro-optical resonator of the whispering-gallery-mode-based seismometer.

Referring to FIG. 22, the whispering-gallery-mode-based seismometer 10 can be mechanically modeled as a parallel combination of a spring 116 and a damper 118 in parallel with the sensing element 18 and in series with the proof mass 12, wherein in the effective spring rate K of the spring 116, and the effective damping rate $R_m$ of the damper 118 each are dependent upon associated contributions from both the microsphere 24' and the spring-mass subassembly 44.

The oscillation of the spring-mass subassembly 44 is the classic case of forced oscillations, where the motion of the frame 14 drives the oscillation of the spring-mass subassembly 44.

The motion of the frame 14 is given by:

$$x = A_B \sin \omega_B t \tag{3}$$

with a corresponding acceleration:

$$\ddot{x} = -\omega^2 A_B \sin \omega t \tag{4}$$

where $A_B$ is the amplitude, $\omega$ is the frequency of frame 14 motion and t is time.

The equation of motion for the proof mass 12, on the other hand, is:

$$m\ddot{x}_m = -K(x_m - x) - R_m(\dot{x}_m - \dot{x}) \quad (5)$$

where m is the effective mass of the proof mass 12, and $x_m$ is the displacement of the proof mass 12, K is the effective spring constant of the spring 16 and $R_m$ is the associated effective damping coefficient. Defining relative displacement as $x_r = x_m - x$, then the equation of motion becomes:

$$m(\ddot{x}_r + \ddot{x}) + R_m \dot{x}_r + K x_r = 0 \quad (6)$$

which then gives:

$$m\ddot{x}_r + R_m \dot{x}_r + K x_r = \omega^2 A_B \sin \omega t. \quad (7)$$

The general solution for the amplitude of the proof mass oscillation is:

$$x_r = e^{-kt}[a_0 \cos \omega_f t + a_1 \sin \omega_f t] + \frac{A_B}{\omega |Z_m|} \cos(\omega t - \vartheta) \quad (8)$$

where $\omega$ is the forcing frequency and $$\omega_f = \omega_0 \sqrt{1 - \left(\frac{k}{\omega_0}\right)^2},$$

the damped frequency, where $$\omega_0 = \sqrt{\frac{K}{m}} \text{ and } k = \frac{R_m}{2m}.$$

Finally, the mechanical impedance is:

$$|Z_m| = \sqrt{R_m^2 + \left(\omega m - \frac{K}{\omega}\right)^2}. \quad (9)$$

The phase term is:

$$\vartheta = \tan^{-1}\left(\frac{m(\omega^2 - \omega_0^2)}{\omega R_m}\right) + \frac{1}{2}\pi. \quad (10)$$

The decay modulus is given by:

$$\tau = \frac{1}{k} = \frac{2m}{R_m} \quad (11)$$

and represents the time required for the amplitude to decay to 1/e for unforced oscillations. After a time duration determined by $\tau$, the oscillation reaches steady state and is controlled by the movement of the frame 14.

The mechanical Q-factor of the whispering-gallery-mode-based seismometer 10, which determines the sensitivity and the bandwidth of the whispering-gallery-mode-based seismometer 10 off-resonance, is defined as:

$$Q = \frac{\sqrt{Km}}{R_m}. \quad (12)$$

The nominal operating frequency and bandwidth of the tunable laser light source 110' is selected in combination with the Q-factor of the microsphere 24' and the associated signal processing method to operate with the materials of the optical fiber 32 and the microsphere 24', and provide for a resulting or specified associated measurement resolution. For example, in one set of embodiments, the nominal wavelength $\lambda$ of the tunable laser light source 110'—for example, that might otherwise be used for telecommunications applications—is selected for operation at either 1.3 microns or 1.5 microns so as to provide for transmission though commercially-available optical fiber 32—for example, that might otherwise be used for telecommunications applications—with relatively small attenuation by the optical fiber 32. In one set of embodiments, bandwidth is selected to be about 10 percent of the corresponding optical resonance bandwidth of the microsphere 24', although depending upon the desired measurement resolution or the signal processing method, this bandwidth could 50 percent or more of the corresponding optical resonance bandwidth of the microsphere 24'. For example, in one set of embodiments, the tunable laser light source 110' comprises a distributed feedback tunable laser diode light source 110" having a spectral line width not exceeding 1.1 GHz. Alternatively, in another set of embodiments, an external cavity tunable laser diode light source 110" having a spectral line width not exceeding 1.1 GHz might also be used. However, it should be understood that all embodiments are not limited to a spectral line width not exceeding 1.1 GHz. Generally any tunable laser light source 110' can be used that is tunable over at least a substantial portion of the free spectral range FSR of the microsphere 24' about the nominal optical resonance frequency of at least one whispering-gallery mode 26 of the microsphere 24' with a sufficiently narrow bandwidth, or spectral line width, to provide for measuring the frequency v of the at least one whispering-gallery mode 26 for a given signal processing method.

The thickness and design of the circular leaf spring 16' determine the stiffness thereof.

A first aspect of a circular leaf spring 16$^{i''}$ comprises a structure formed of a sheet elastic material 120, for example, stainless steel, comprising, in plan view—as illustrated in FIGS. 23-27—a first plurality of at least three radially-extending elastic beam portions 122, wherein for each of a corresponding at least three annularly-bounded sectors 124 located within an annular region 126 between the central portion 46 and a peripheral portion 48 of the structure, at least one radially-extending elastic beam portion 122 extends outward from a central portion 46 of the sheet elastic material 120 and is centered in the corresponding annularly-bounded sector 124. Each corresponding annularly-bounded sector 124 of the structure comprises:

a. first 128.1 and second 128.2 radially-extending elastic beam portions at corresponding first 130.1 and second 130.2 azimuthal boundaries of the corresponding annularly-bounded sector 124, wherein the first 128.1 and second 128.2 radially-extending elastic beam portions extend inwards from the peripheral portion 48 of the structure;

b. a first serpentine elastic structure 132.1 extending between a radially-inward portion 134.1 of the first radially-extending elastic beam portion 128.1 of the corresponding annularly-bounded sector 124 and a first radially outward portion 136.1 of the at least one radially-extending elastic beam portion 122 centered in the corresponding annularly-bounded sector 124; and c. a second serpentine elastic structure 132.2 extending between a radially-inward portion 134.2 of the second radially-extending elastic beam portion 128.2 of the corresponding annularly-bounded sector 124 and a second radially outward portion 136.2 of the at least one radially-extending elastic beam portion 122 centered in the corresponding annularly-bounded sector 124, wherein each of the first 132.1 and second 132.2 serpentine elastic structures each comprise a plurality of radially-extending elastic beam portions 138, each interconnected with corresponding azimuthally-extending torsional elastic portions 140.1, 140.2 at alternate radially-inner and radially-outer regions of the annularly-bounded sector 124, respectively.

Figure 23:
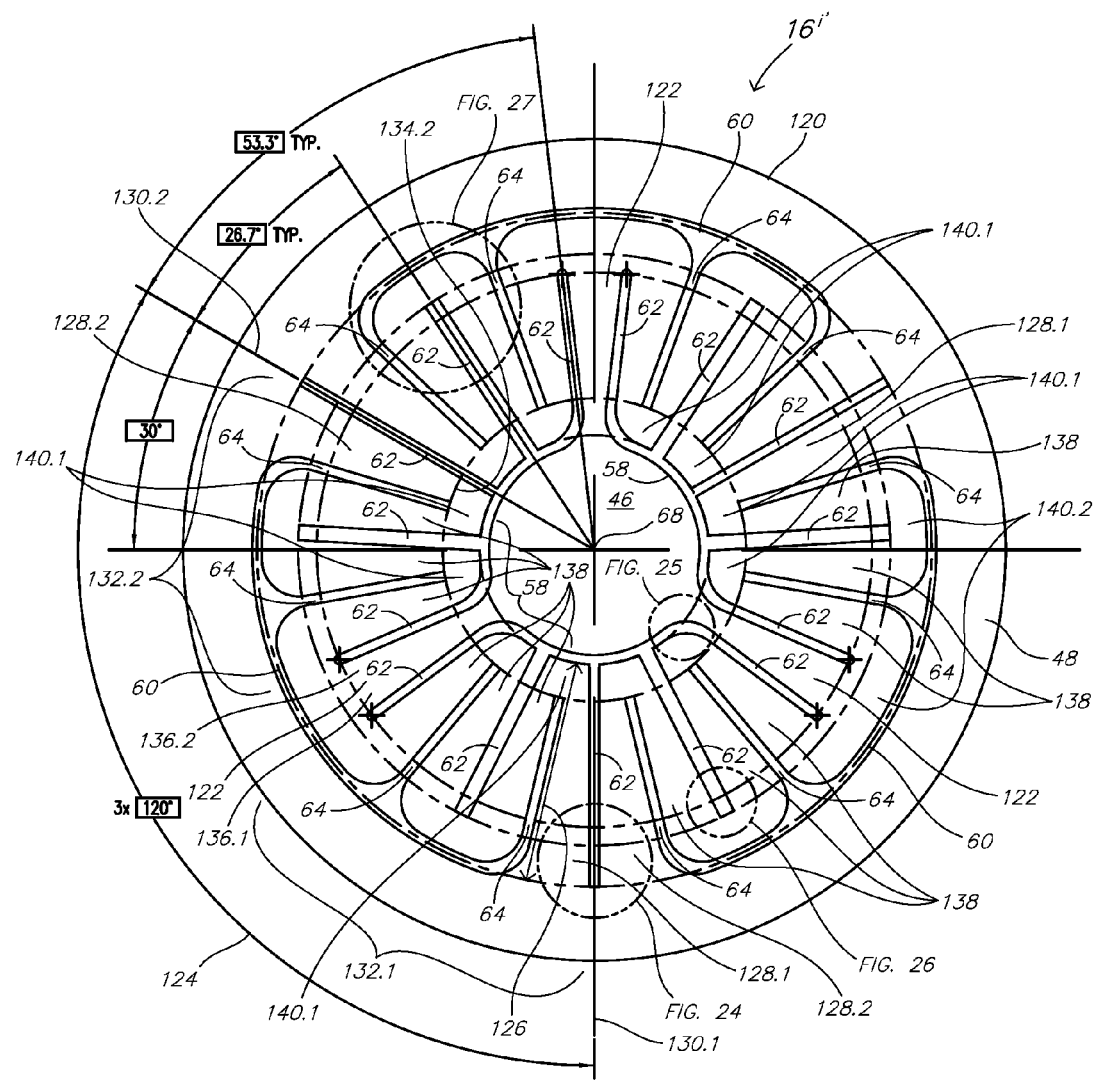
FIG. 23 illustrates a plan view of a first embodiment of a first aspect of a spring element of a whispering-gallery-mode-based seismometer.
Figure 24:
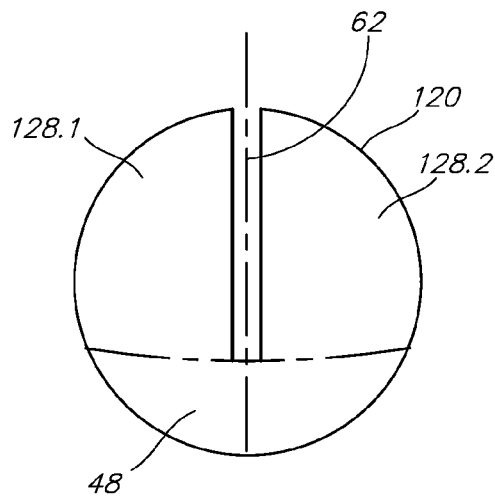
FIGS. 24-27 illustrate various details of the first embodiment of the spring element illustrated in FIG. 23.
Figure 25:
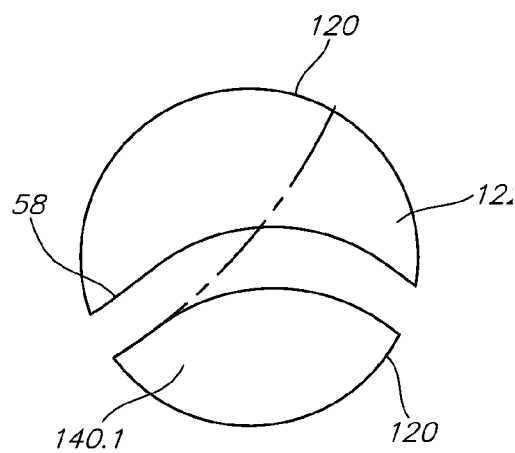
Figure 26:
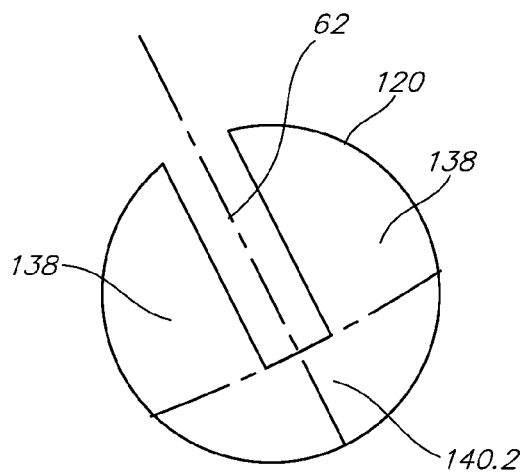
Figure 27:
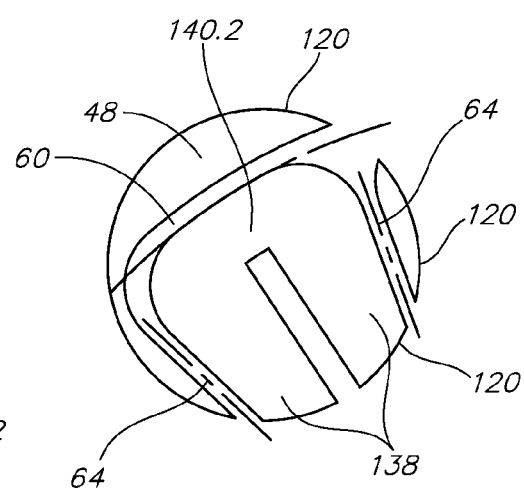

For example, in one set of embodiments, each radially-extending elastic beam portion 122 extends radially outward from the central portion 46 of the sheet elastic material 120, and the first 128.1 and second 128.2 radially-extending elastic beam portions extend radially inwards from the peripheral portion 48 of the structure. In another set of embodiments, different annularly-bounded sectors 124 are substantially similar to one another. In yet another set of embodiments, the first 132.1 and second 132.2 serpentine elastic structures are substantially mirror-image symmetric to one another relative to the corresponding radially-extending elastic beam portion 122 in the corresponding annularly-bounded sector 124. As an alternative to the first embodiment of a circular leaf spring 16$^{i'}$ is illustrated in FIG. 23, the adjacent first 128.1 and second 128.2 radially-extending elastic beam portion of adjacent annularly-bounded sectors 124 could be combined, rather than being separated with a first radial slot 62 as so illustrated. Although FIG. 23 illustrates each first 132.1 and second 132.2 serpentine elastic structure comprising three radially-extending elastic beam portions 138 located between the corresponding associated radially-extending elastic beam portion 122 and the corresponding associated first 128.1 or second 128.2 radially-extending elastic beam portion, it should be understood that each first 132.1 and second 132.2 serpentine elastic structure could generally comprise an odd number of one or more radially-extending elastic beam portions 138, for example, only one, three as illustrated in FIG. 23, or more than three.

The first embodiment of a circular leaf spring 16$^{i'}$ was tested to verify that the associated spring-mass subassembly 44 provides for an associated bandwidth of at least 40 Hz, and that the associated circular leaf spring 16$^{i'}$ is sufficiently compliant so as to provide for sufficient deflection over the range of motions so as to provide for sufficient compression of an associated polymeric microsphere 24' by the associated proof mass 12 so as to provide for detecting the associated deformation of the microsphere 24' from shifts in frequency of the associated whispering-gallery mode 26 thereof as detected by the wavelength λ of light 28 from the associated optical fiber 32 operatively associated therewith at which resonance absorption thereof occurs under nano-g levels of acceleration of the associated frame 14.

Figure 28:
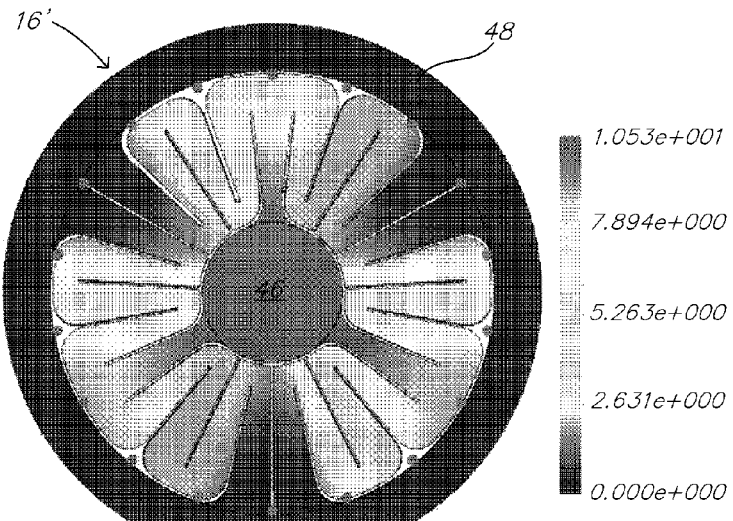
FIG. 28 illustrates a simulation of a mode shape of a spring element subjected to axial vibration transverse to the plane of the spring, with associated RMS displacement shown by halftone pixel density.
Figure 29:
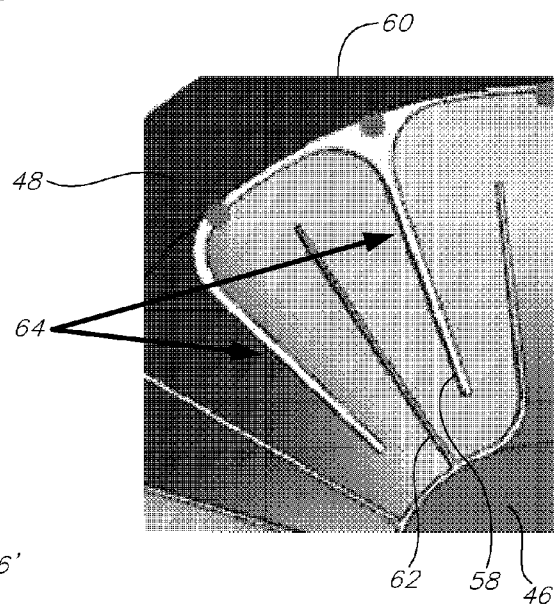
FIG. 29 illustrates a portion of the spring element illustrated in FIG. 28.
Figure 30:
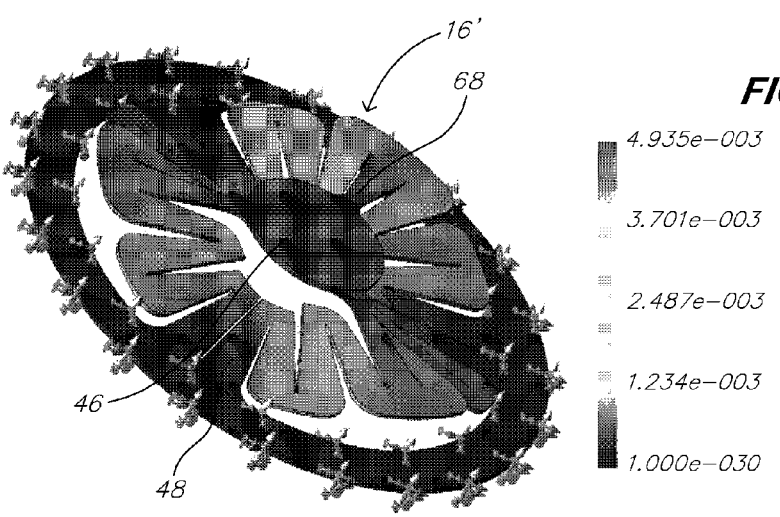
FIG. 30 illustrates a three-dimensional view of the deformation of the spring element illustrated in FIG. 28 at a particular point in time.

Finite element analysis was used to determine the optimal shape of the circular leaf spring 16$^{i'}$ and the associated displacement thereof. The circular leaf spring 16$^{i'}$ is designed to be sufficiently compliant so as to provide for deflections over a range of several nanometers and yet stiff enough to provide for a relatively flat amplitude response up to a vibration frequency of about 40 Hz. A simulation of one of the embodiments of the circular leaf spring 16$^{i'}$ is illustrated in FIGS. 28-30, wherein the associated leaves of the circular leaf spring 16$^{i'}$ are deflected in a direction along the central axis 68 of the single-axis whispering-gallery-mode-based seismometer 10' and normal to the plane of the circular leaf spring 16$^{i'}$. This design provides for radial stability under gravitational acceleration.

Figure 31:
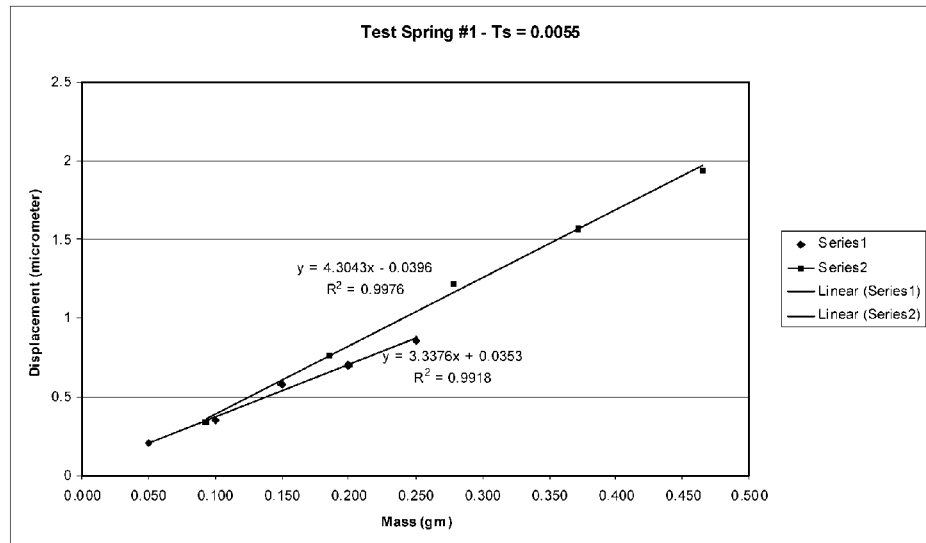
FIG. 31 illustrates a plot of measured displacement as a function of the mass supported under gravitational acceleration by one embodiment of the spring element of the sensing element of a whispering-gallery-mode-based seismometer.
Figure 32:
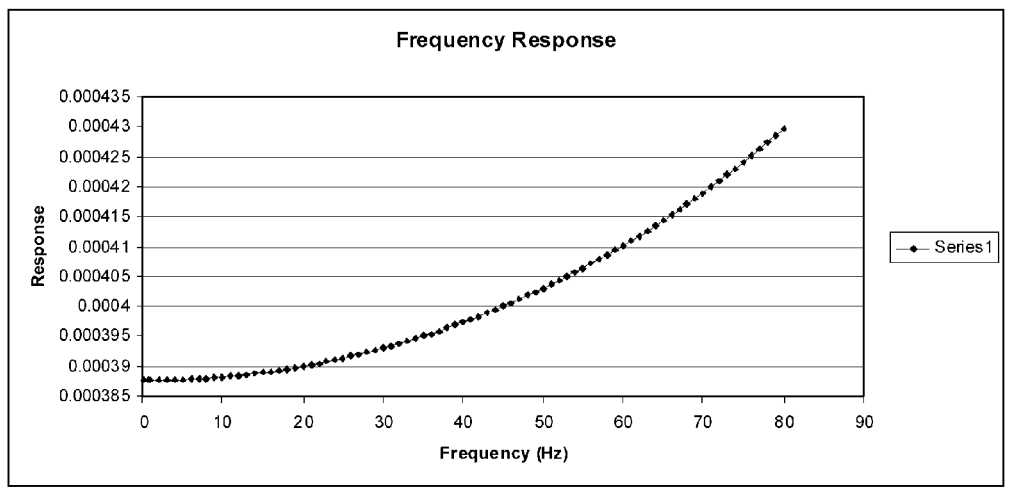
FIG. 32 illustrates a plot of simulated amplitude response as a function of frequency for one embodiment of the spring element of the sensing element of a whispering-gallery-mode-based seismometer.

The stiffness of the circular leaf spring 16$^{i'}$ is dependent upon the thickness of the spring and the width of the associated slots. The stiffness was measured by loading the central portion 46 of the circular leaf spring 16$^{i'}$ with calibrated masses under gravitational acceleration and measuring the elongation using a proximity sensor placed under the central portion 46 of the circular leaf spring 16$^{i'}$. Referring to FIG. 31, as a result, the circular leaf spring 16$^{i'}$ stretched by 3.8 micrometer/gram, which corresponds to a spring stiffness of $2.58 \times 10^3$ kg/s$^2$. For a proof mass of 10 gm, the resonant frequency is 80 Hz, which is sufficiently above the cut-off bandwidth at 40 Hz to provide a relatively flat amplitude vs. frequency response for the whispering-gallery-mode-based seismometer 10, as illustrated in FIG. 32. The corresponding spring elongation is a few hundred pico-meters, which is sufficient to generate a measurable shift in the associated whispering-gallery mode 26 resonance of the associated microsphere 24'.

Referring to FIGS. 33-38, there are illustrated alternative second through seventh aspects of a circular leaf spring 16', each constructed of sheet elastic material 120—for example, stainless steel—by removing the sheet elastic material 120 from associated cut-out regions 142, with the resulting mechanical properties of the circular leaf spring 16' responsive to the remaining sheet elastic material 120 extending continuously between central 46 and peripheral 48 portions of the circular leaf spring 16'.

Figure 33:
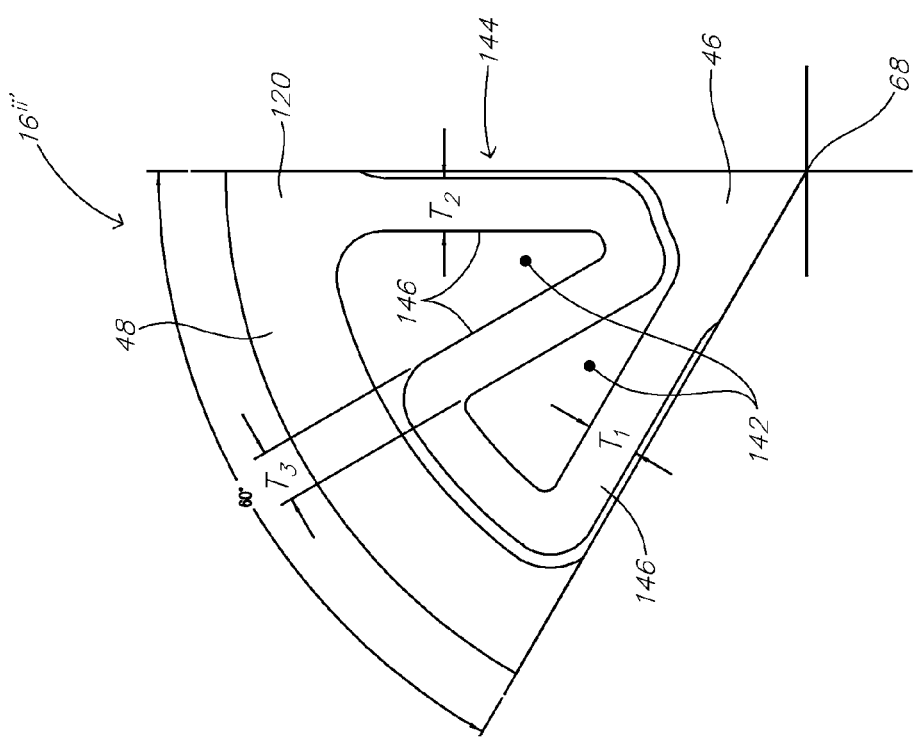
FIG. 33 illustrates a plan view of second aspect of a spring element of a whispering-gallery-mode-based seismometer.

Referring to FIG. 33, a second aspect of a circular leaf spring 16', 16$^{ii'}$ comprises a plurality of six serpentine structures 144, each extending between the central 46 and peripheral 48 portions of the circular leaf spring 16', 16$^{ii'}$, each incorporating interconnected elastic beam portions 146 of primarily radial extent and of relatively constant width with respect to one another, for example with $T_1$ substantially equal to $T_2$ substantially equal to $T_3$, and with azimuthally-adjacent serpentine structures 144 azimuthally symmetric with respect to a radial boundary therebetween so as to provide for a substantially balanced structure that provides for minimizing a rotation of the central portion 46 about the central axis 68 responsive to a motion thereof along the central axis 68 of the circular leaf spring 16', 16$^{ii'}$.

Figure 34:
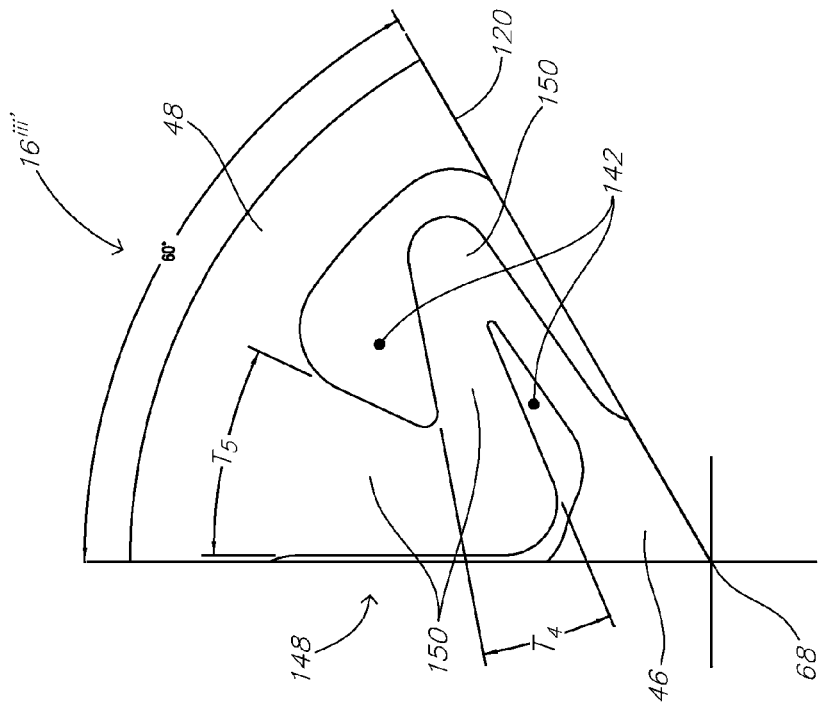
FIG. 34 illustrates a plan view of third aspect of a spring element of a whispering-gallery-mode-based seismometer.

Referring to FIG. 34, a third aspect of a circular leaf spring 16', 16$^{iii'}$ comprises a plurality of six serpentine structures 148, each extending between the central 46 and peripheral 48 portions of the circular leaf spring 16', 16$^{iii'}$, each incorporating interconnected elastic beam portions 150 of primarily radial extent and of generally increasing width with increasing distance from the central portion 46 to the peripheral portion 48 along the serpentine structures 148, for example with $T_5$ greater than $T_4$, and with azimuthally-adjacent serpentine structures 148 azimuthally symmetric with respect to a radial boundary therebetween so as to provide for a substantially balanced structure that provides for minimizing a rotation of the central portion 46 about the central axis 68 responsive to a motion thereof along the central axis 68 of the circular leaf spring 16', 16$^{iii'}$. The response of the circular leaf spring 16', 16$^{iii'}$ would be expected to be similar to a conical helical spring 16.

Referring to FIG. 35, a fourth aspect of a circular leaf spring 16', 16$^{iv'}$ comprises a plurality of three serpentine structures 152, each extending between the central 46 and peripheral 48 portions of the circular leaf spring 16', 16$^{iv'}$, each incorporating interconnected elastic beam portions 154 of primarily azimuthal extent and of generally constant radial width so that $dR_1$ is substantially equal to $dR_2$.

Referring to FIG. 36, a fifth aspect of a circular leaf spring 16', 16$^{v'}$ comprises a plurality of three serpentine structures 156, each extending between the central 46 and peripheral 48 portions of the circular leaf spring 16', 16$^{v'}$, each incorporating interconnected elastic beam portions 158 of primarily azimuthal extent and of increasing radial width with increasing nominal radial distance from the central axis 68 of the circular leaf spring 16', 16$^{v'}$ so that $dR_3$ is greater than $dR_4$. The response of the circular leaf spring 16', 16$^{v'}$ would be expected to be similar to a conical helical spring 16.

Figure 37:
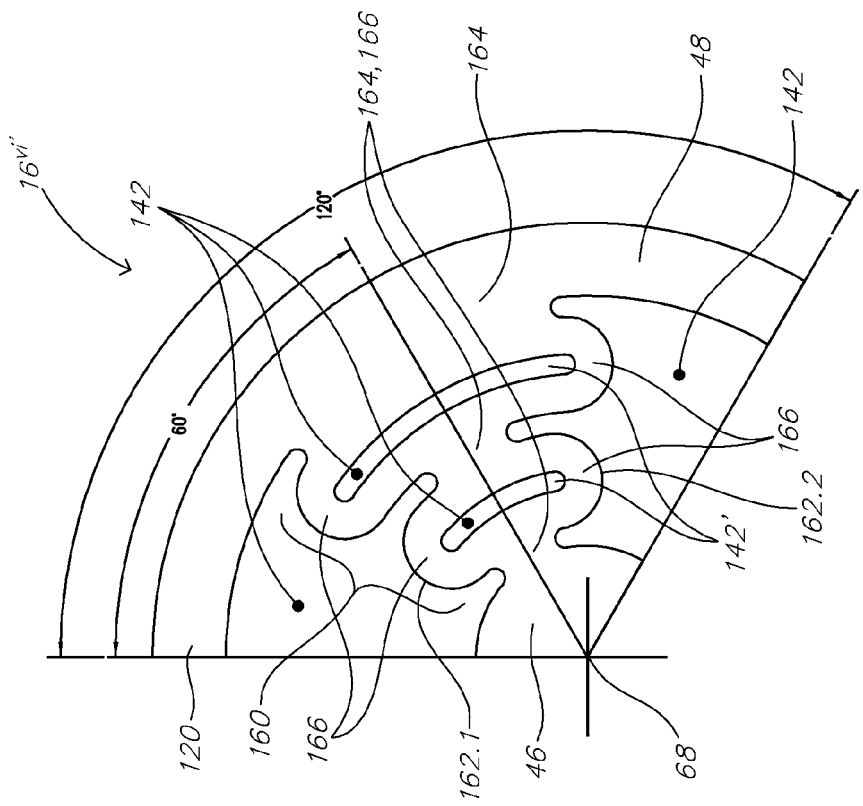
FIG. 37 illustrates a plan view of sixth aspect of a spring element of a whispering-gallery-mode-based seismometer.

Referring to FIG. 37, a sixth aspect of a circular leaf spring 16', 16$^{vi'}$ comprises a plurality of three generally radially-oriented arm structures 160, each of what is referred to as a generally "pull-tab" configuration, each extending between the central 46 and peripheral 48 portions of the circular leaf spring 16', 16$^{vi'}$, wherein each radially-oriented arm structure 160 comprises first 162.1 and second 162.2 serpentine profiles that are azimuthally symmetric with respect to one another, and further comprises a plurality of azimuthally arcuate cut-out regions 142', each of increasing azimuthal extent with increasing radial distance from the central axis 68 of the circular leaf spring 16', 16$^{vi'}$ so as to define a plurality of associated necked portions 164 of the radially-oriented arm structures 160 each radially either between or proximally-adjacent to corresponding azimuthally arcuate cut-out regions 142', thereby defining corresponding relatively more compliant portions 166 of the radially-oriented arm structures 160 that experience relatively greater amounts of localized deformation responsive to a motion of the central portion 46 of the circular leaf spring 16', 16$^{vi'}$ along the central axis 68 of the circular leaf spring 16', 16$^{vi'}$.

Figure 38:
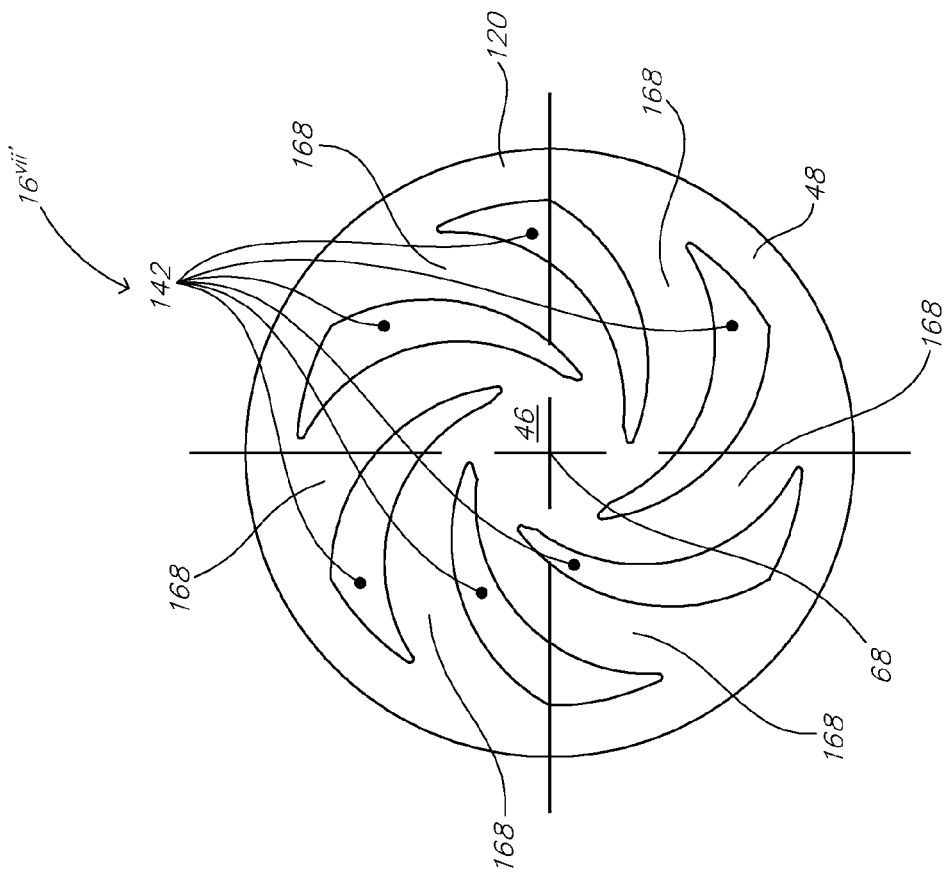
FIG. 38 illustrates a plan view of seventh aspect of a spring element of a whispering-gallery-mode-based seismometer.

Referring to FIG. 38, a seventh aspect of a circular leaf spring 16', 16$^{vii'}$ comprises a plurality of spiral arms 168 extending between the central 46 and peripheral 48 portions of the circular leaf spring 16', 16$^{vii'}$, for example, either increasing in width with increasing radial distance from the central axis 68 of the circular leaf spring 16', 16$^{vii'}$ as illustrated in FIG. 38, or of a substantially constant width that is invariant with respect to radial distance. The number of spiral arms 168 is arbitrary, however, in most cases the spiral arms 168 would be uniformly spaced from one another azimuthally around the central 46 and peripheral 48 portions of the circular leaf spring 16', 16$^{vii'}$. The spiral arms 168 would be expected to cause a slight rotation of the central portion 46 of the circular leaf spring 16', 16$^{vii'}$ about the central axis 68 responsive to an axial motion thereof along the central axis 68, which would generally not be the case for the other aspects of the circular leaf spring 16' described hereinabove.

Figure 39:
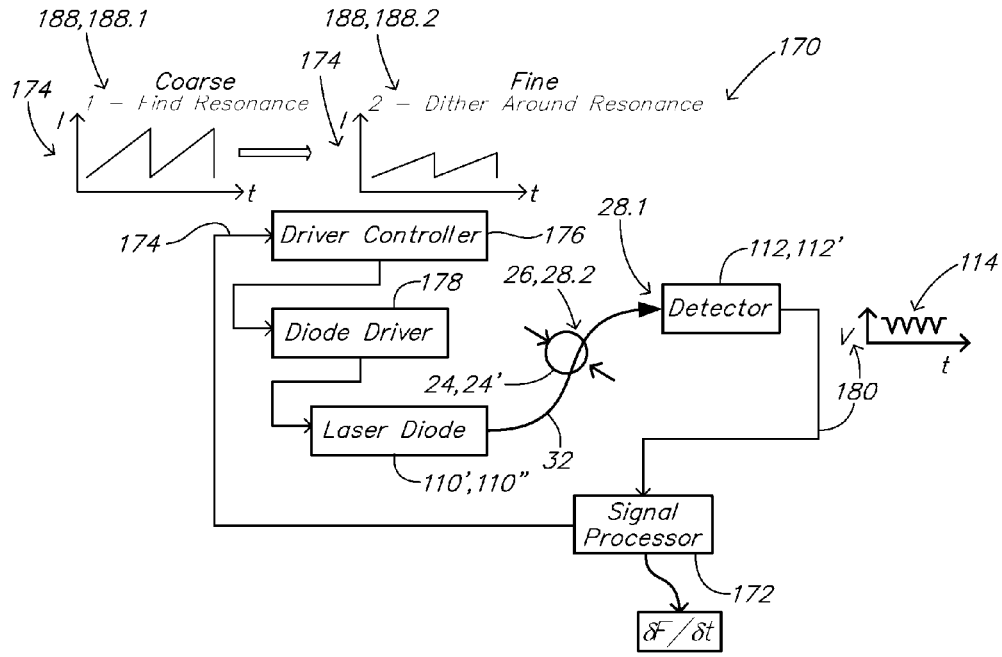
FIG. 39 illustrates a block diagram of a detection system of a whispering-gallery-mode-based seismometer.
Figure 40:
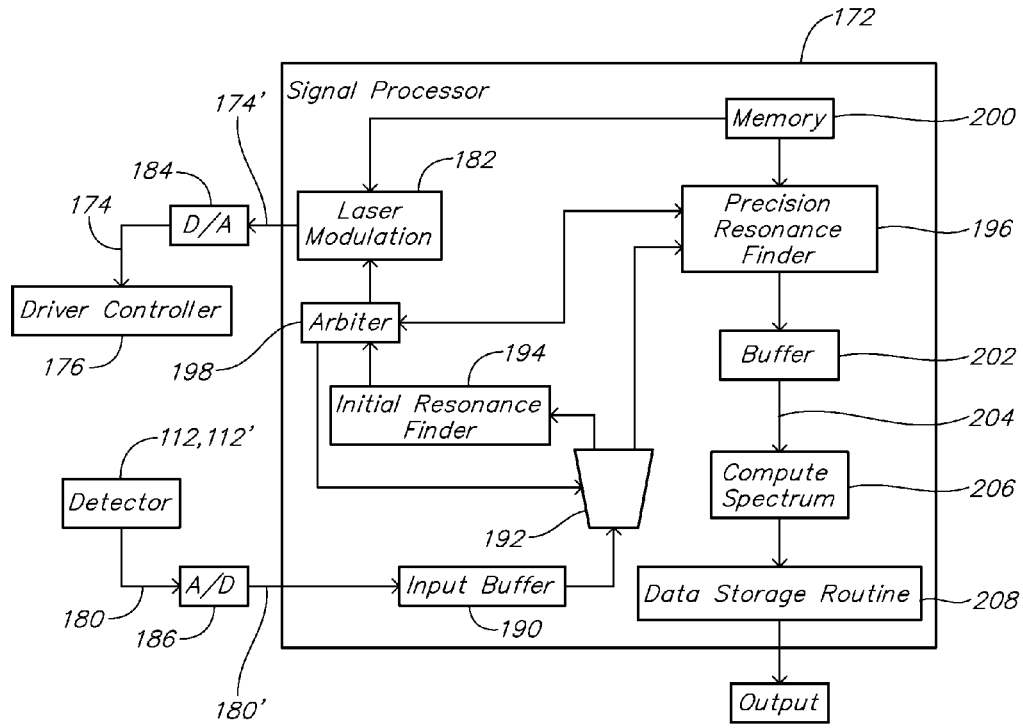
FIG. 40 illustrates a block diagram of a signal processor of the detection system illustrated in FIG. 39, in cooperation with an associated detector and laser drive controller.

Referring to FIGS. 39 and 40, an associated detection system 170 operatively coupled to the optical fiber 32 provides for illuminating a first end 32.1 of the optical fiber 32 with light 28 from the tunable laser light source 110', controlling the wavelength λ of the light 28 by controlling the tunable laser light source 110', detecting a second portion 28.1 of that light 28 that is transmitted through the optical fiber 32 to the second end 32.2 thereof after interaction with the micro-optical resonator 24, 24', and determining therefrom and thereby a measure of or responsive to the optical resonant frequency $v_0$ of the micro-optical resonator 24, 24', which then provides for determining either the instantaneous displacement of the proof mass 12 relative the inertial frame of reference 22 or the corresponding acceleration of the whispering-gallery-mode-based seismometer 10, from a calibration thereof, wherein the detection system 170 provides for tracking the optical resonant frequency $v_0$ so as to be responsive to changes thereof as a result of motion affecting the whispering-gallery-mode-based seismometer 10 along the central axis 68 thereof.

Figure 41:
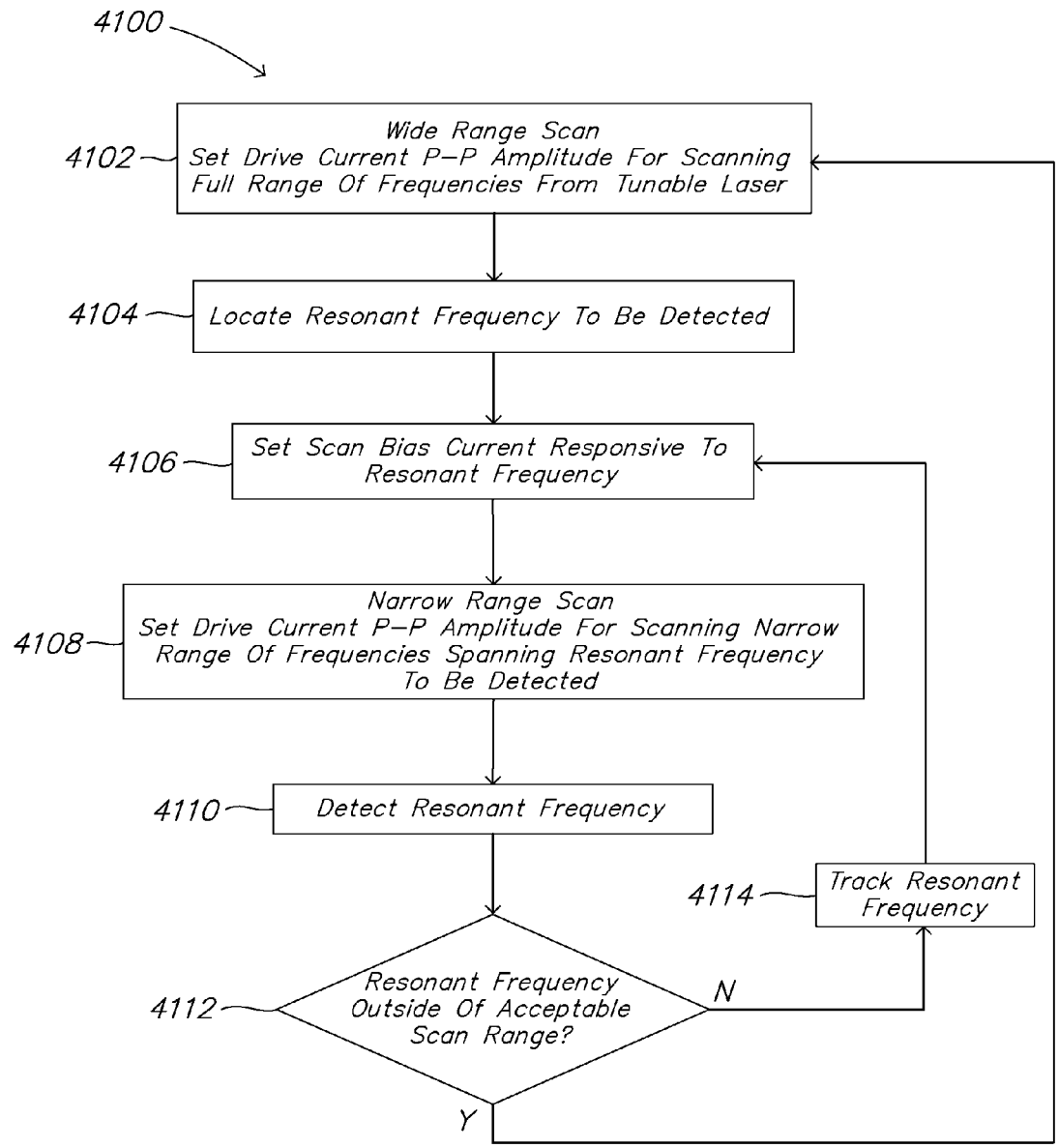
FIG. 41 illustrates a flow chart of a detection process.

More particularly, in one embodiment, the detection system 170 comprises a signal processor 172 that outputs a drive current control signal 174 to a drive controller 176, that in turn controls a laser diode driver 178, that in turn controls a drive current applied to a tunable laser diode light source 110" so as to provide for controlling the wavelength λ of the light 28 into the first end 32.1 of the optical fiber 32 from the tunable laser diode light source 110". The detection system 170 further comprises a photo-detector 112, for example, a photo-diode 112', operatively associated with the second end 32.2 of the optical fiber 32 so as to provide for receiving the above-described first portion 28.1 of light 28 therefrom, wherein the photo-detector 112 generates a detection signal 180 responsive to the intensity of that first potion 28.1 of light 28. The signal processor 172 receives the detection signal 180 from the photo-detector 112 and controls the drive current control signal 174 responsive thereto in accordance with an associated detection process 4100, for example, as illustrated in FIG. 41.

More particularly, referring to FIG. 40, in accordance with one embodiment, a laser modulation block 182 of the signal processor 172 generates a digital output signal 174' that is converted by a D/A converter 184 to the drive current control signal 174 to drive the tunable laser diode light source 110", and receives the resulting detection signal 180 from the photo-detector 112, but as a digital input signal 180' after conversion by an associated A/D converter 186, wherein the detection signal 180 is responsive to the frequency v of the light 28 generated by the tunable laser diode light source 110" and the acceleration-responsive deformation of the micro-optical resonator 24, 24'.

For example, the digital output signal 174' and the associated drive current control signal 174 each comprise a periodic waveform—for example, a saw-tooth waveform 188—having a given peak-to-peak amplitude—for example, as generated by either table lookup process or directly from associated counters—and a given time period. For example, in one embodiment, the time period is set to 1 millisecond for all scans, although the magnitude of this period is not limiting.

In accordance with one set of embodiments, the digital input signal 180' is stored in an input buffer 190 and then input by a switching process 192 to either an initial resonance finder block 194 or a precision resonance finder block 196 under control of an arbiter 198, depending upon the particular mode of the associated detection process, i.e. acquisition or tracking, as described more fully hereinbelow, wherein the associated memory 200 used in the signal processor 172 may be implemented either a plurality of registers, Flash memory, or Random Access Memory (RAM) depending upon the particular nature of the signal processor 172. Alternatively, either given sufficient processing power or using an alternative algorithm, the initial resonance finder block 194 may provide for a sufficiently precise result so as to provide for dispensing with the need for a separate precision resonance finder block 196, so as to also provide for dispensing with the corresponding associated arbiter 198 and switching process 192. The input buffer 190 provides for decoupling the associated clocks of the A/D converter 186 and signal processor 172. The output of the precision resonance finder block 196 is stored in an associated buffer 202 and comprises a measure of the instantaneous optical resonant frequency $V_0$ of the micro-optical resonator 24, 24' responsive to the instantaneous deformation thereof. A time series 204 of measures of the instantaneous optical resonant frequency $v_0$ may be optionally collected in a spectrum calculation block 206 that provides for calculating the associated mechanical vibration frequency spectrum of the corresponding time-varying acceleration to which the whispering-gallery-mode-based seismometer 10 is subjected. For example, the associated frequency spectrum may be calculating from a Fourier transform of the corresponding time series data, for example, using either an FFT or a DFFT algorithm. Alternatively, the instantaneous resonance measures could be outputted directly from the signal processor 172. An associated data storage routine 208 provides for coordinating the outputting and/or storage of the resulting data, for example, to either Flash memory, a hard drive, some other memory device, or a communications network, for example, either a wireless device or the Internet.

More particularly, referring to FIGS. 41, 42a and 42b, beginning with step (4102), upon power up, the arbiter 198 defaults to operatively coupling the output of the input buffer 190 to the initial resonance finder block 194, whereupon a first saw-tooth waveform 188.1 is generated having a relatively maximum peak-to-peak amplitude, so as to provide for corresponding relatively maximum peak-to-peak amplitude drive current control signal 174, so as to cause the tunable laser diode light source 110" to generate a time varying optical frequency v swept over a relatively wide range of optical frequencies v, for example, the maximum possible range of optical frequencies v of the tunable laser diode light source 110". Depending upon the range of optical frequencies v and the free spectral range FSR of the micro-optical resonator 24, 24', the resulting detection signal 180 may exhibit a plurality of nulls or dips 114. For example, in one set of embodiments, about four to five nulls or dips 114 are typically observed responsive to the a frequency sweep using the first saw-tooth waveform 188.1. For example, referring to FIG. 42a, the optical frequency v, wavelength λ or drive current I is scanned between values $A_1$ and $B_1$ during the initial wide-range scan, resulting in three apparent nulls or dips 114 in the resulting detection signal 180. Generally, any of optical frequency v, wavelength λ or drive current I will be referred to as a measure of optical frequency 214 in a corresponding frequency space 216, wherein for practical purposes, a measure of drive current I may be conveniently used as this measure of optical frequency 214. A first threshold detection level 210 is defined that is sufficiently small so that there exists no more than one null or dip 114 in at least one subset of continuous data 212 having values less than the first threshold detection level 210.

Then, in step (4104), a resonance 114' associated with one of the subsets of continuous data 212 is identified and located, for example, by either locating the corresponding measure of optical resonance frequency 214' for which the value of either the corresponding detection signal 180, or a model of the detection signal as a function of measure of optical frequency 214—for example, a least squares fit of a $4^{th}$ or $5^{th}$ order polynomial using, for example, 20-40 data points,—is a minimum; or by finding the location of a peak of a corresponding cross-correlation function given by the cross correlation of the detection signal 180 with a model in frequency space 216 representative of a null or dip 114, wherein the cross-correlation function may be evaluated either using a convolution integral or a corresponding Fourier transform. The particular method selected for locating the measure of optical resonance frequency 214' can depend upon the corresponding associated Signal-to-Noise Ratio (SNR).

For example, in one set of embodiments, the subset of continuous data 212 in which the measure of optical resonance frequency 214' is located—for example, spanning values of the measure of optical frequency 214 ranging between $A_2'$ and $B_2'$ in FIG. 42a—is selected from one of a) being closest to the middle of the associated scan range ($A_1$-$B_1$), b) for which the associated null or dip 114 most closely exhibits an ideal shape, for example, as measured by a cross-correlation with a model of such an ideal shape, or c) for which the null or dip 114 exhibits the highest Q-factor. In one set of embodiments, nulls or dips 114 that are not monotonic both below and above the prospective measure of optical resonance frequency 214' —i.e. so as to exhibit a plurality of localized nulls or dips 114 therein—are not selected. Furthermore, in another set of embodiments, the process of locating the measure of optical resonance frequency 214' is performed over a relatively narrower range of measure of optical frequency 214 within the subset of continuous data 212, for example, for which the corresponding values of the detection signal 180 are less than a second threshold detection level 218, wherein the second threshold detection level 218 is sufficiently high so as to exceed the value of the detection signal 180 at a corresponding at least one measure of optical resonance frequency 214' by a sufficient amount so that the resulting relatively narrower range of measure of optical frequency 214 contains a sufficient number of data points to provide for locating the measure of optical resonance frequency 214'.

After the measure of optical resonance frequency 214' is located in step (4104), then, in step (4106), the arbiter 198 causes the switching process 192 to direct the output of the input buffer 190 to the precision resonance finder block 196 so as to provide for more precisely locating the measure of optical resonance frequency 214', and so as to provide for tracking the measure of optical resonance frequency 214' over time. More particularly, the precision resonance finder block 196 causes the laser modulation block 182 to generate a second saw-tooth waveform 188.2 having a relatively smaller peak-to-peak value than the first saw-tooth waveform 188.1 and biased at the corresponding measure of optical resonance frequency 214' from step (4104) so as to provide for scanning over a relatively narrower range of the measure of optical frequency 214, in what is also referred to as a "dither scan", for example, in which the associated scan range $A_2$ to $B_2$ illustrated in FIG. 42b is set so as to include the endpoints $A_2'$, $B_2'$ that were located from the relatively wide-range scan of step (4102) and to be substantially centered about the measure of optical resonance frequency 214' located from step (4104). Alternatively, the narrower range of the measure of optical frequency 214 for the "dither scan" could be some factor of the range $A_2$ to $B_2$, centered about the measure of optical resonance frequency 214', for example, in one embodiment, with the factor having a value of two.

Then, in step (4108), the laser modulation block 182 outputs the second saw-tooth waveform 188.2 to the D/A converter 184 and the drive controller 176 so as to provide for scanning the frequency v or wavelength λ of light 28 from the tunable laser diode light source 110" over the corresponding relatively narrower range of the corresponding measure of optical frequency 214. For example, in one set of embodiments, the peak-to-peak value of the second saw-tooth waveform 188.2 is about $\frac{1}{5}^{th}$ the corresponding peak-to-peak value of the first saw-tooth waveform 188.1. Then, in step (4110), the detected measure of optical resonance frequency 214" is located by a process similar to that described hereinabove in respect of step (4104), and the resulting detected measure of optical resonance frequency 214" is output to the buffer 202.

Then, in step (4112), if the resulting detected measure of optical resonance frequency 214" is within a corresponding acceptable scan range, the process continues with step (4114), which provides for tracking the detected measure of optical resonance frequency 214" over time and accordingly adjusting the corresponding bias value used in step (4106). The tracking process used in step (4112) can be as simple as using the current detected measure of optical resonance frequency 214" as the next bias value, or a more sophisticated estimation process, or optimal estimation process, for example, as might be used in the field of radar signal processing.

If, in step (4112), the resulting detected measure of optical resonance frequency 214" is within a corresponding acceptable scan range, then the process repeats with step (4102), so as to provide for reacquiring the measure of optical resonance frequency 214' from a relatively wide scan of the measure of optical frequency 214 and then resume tracking the corresponding resulting newly-determined detected measure of optical resonance frequency 214".

Alternatively, either given sufficient processing power or by using the above-described cross-correlation process, the detected measure of optical resonance frequency 214" may be found in step (4104) by operating on the entire detection signal 180/digital input signal 180' from step (4102), and then directly tracked in step (4114), thereby dispensing with the need for steps (4106)-(4112).

Further alternatively, methods that have been developed in others technological fields, for example, in the field of radar signal processing, for detecting pulses and corresponding associated pulse positions, can be used in and by the detection system 170 to locate and track the resonance(s) 114' in the detection signal 180

The frequency spectrum of the detection signal 180 shifts in response to changes in the optical resonant frequency $v_0$ of the whispering-gallery modes 26, for example, thereby causing the waveforms illustrated in FIGS. 42a-b to shift relative to the associated frequency space 216. Accordingly, the optical resonant frequency $v_0$ of the whispering-gallery modes 26 may be tracked either by tracking the associated measures of optical resonance frequency 214', or by tracking the peaks of the detection signal 180, either directly in frequency space 216, or by a cross correlation of the detection signal 180 with a corresponding model of a representative peak in frequency space 216.

Although the detection signal 180 from the photo-detector 112 exhibits nulls or dips 114 at resonance 114', it should be understood that this detection signal 180 can be subsequently inverted either by electronic hardware or software, so as to transform the process of finding and tracking nulls or dips 114 in the detection signal 180 to one of finding and tracking peaks in the corresponding inverted signal.

The whispering-gallery-mode-based seismometer 10 may be calibrated empirically using a calibrated shake table to which the whispering-gallery-mode-based seismometer 10 is attached, wherein the shake table is run over a range of known frequencies and acceleration amplitudes, so as to provide for modeling the known amplitudes as a function of the corresponding detected measure of optical resonance frequency 214" from the whispering-gallery-mode-based seismometer 10 so as to generate a corresponding calibration function for each given known frequency or range of known frequencies. The measured bandwidth of the whispering-gallery-mode-based seismometer 10 will generally depend upon the corresponding mechanical properties of the spring-mass subassembly 44, i.e. the effective spring rate K, effective mass m, and effective damping rate $R_m$.

More particularly, the signal output from the whispering-gallery-mode-based seismometer 10 is a voltage or a digital representation of the voltage produced by the whispering-gallery-mode-based seismometer 10, the amplitude of which corresponds to the amplitude of the acceleration experienced thereby, and the spectrum of which corresponds to the associated acceleration spectrum. The acceleration is provided for each time slice or measurement interval. The spectrum is calculated over a time slice that is determined by the desired spectral width. The spectral time slice will be longer if lower frequencies are desired, and the high frequency extent of the spectrum is determined by the acceleration measurement interval.

In accordance with one embodiment, the tunable laser diode light source 110" incorporates an integrated bias-T network comprising an inductor/resistor network attached to the input of the associated laser diode which provides for modulation of the associated drive current, thereby providing for the use of an associated co-located radio frequency (RF) port to modulate the tunable laser diode light source 110" instead of using the modulation port on the drive controller 176.

The control and detection circuitry of the signal processor 172 can be embodied in a variety of ways, including, but not limited to, dedicated hardware, an Application Specific Integrated Circuit (ASIC), a Digital Signal Processor (DSP), a Micro-Controller, a Field Programmable Gate Array (FPGA), or some other signal processing device or a plurality of signal processing devices in cooperation with one another. For example, in one set of embodiment, the signal processor 172 is implemented with a Field Programmable Gate Array (FPGA), which provides for development flexibility, accommodates a relatively high upper bound to the associated clock rate (for example, 160 MHz to 250 MHz), and provides for each module or task therein to be treated conceptually as a separate thread. Accordingly, a Field Programmable Gate Array (FPGA) provides for substantially equivalent functionality to dedicated hardware, but in a relatively physically small package, and that can be readily programmed or re-programmed.

Figure 43:
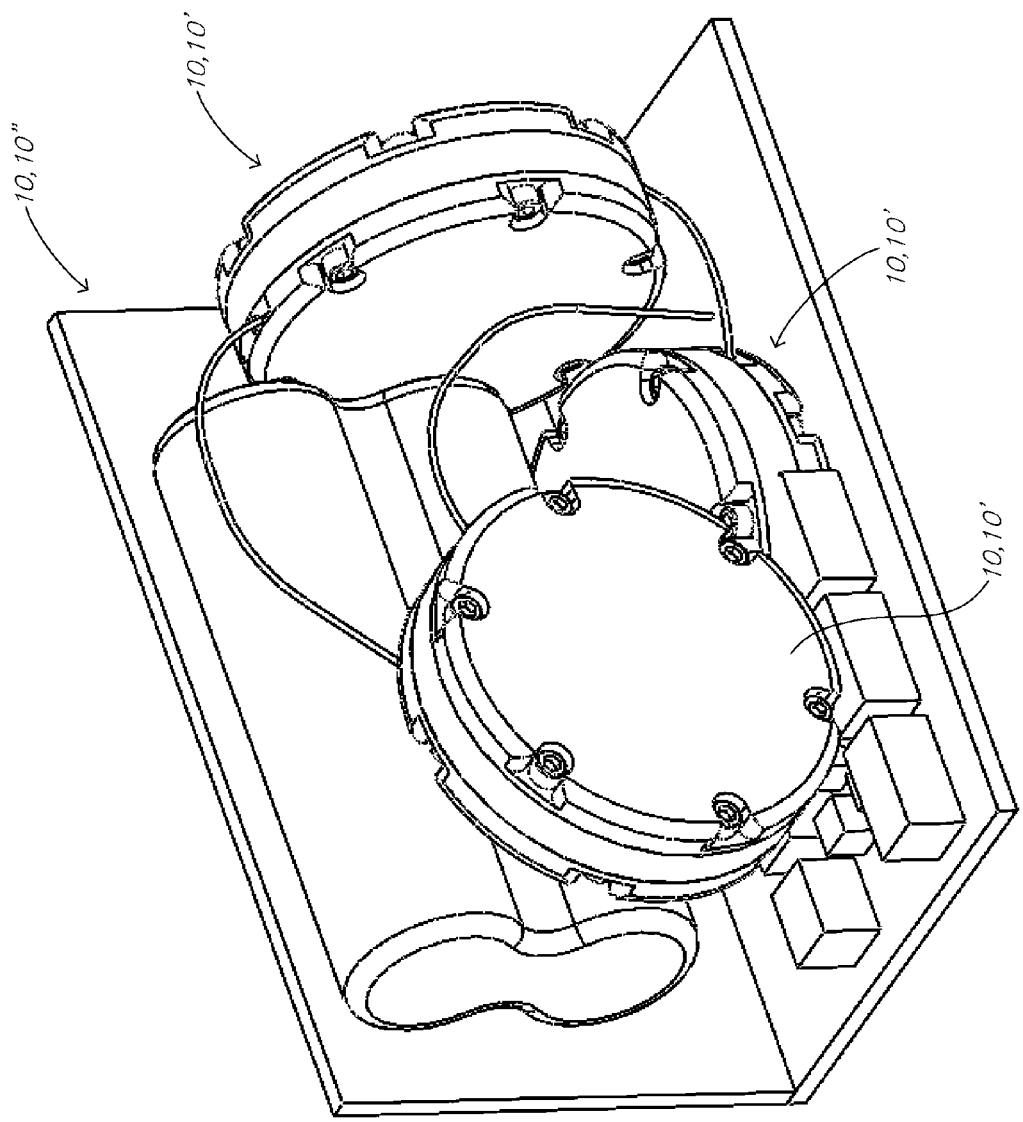
FIG. 43 illustrates a first embodiment of a triple-axis whispering-gallery-mode-based seismometer incorporating three single-axis whispering-gallery-mode-based seismometers having relatively orthogonally oriented associated sensing axes.

Referring to FIG. 43, three single-axis whispering-gallery-mode-based seismometers 10' with relatively orthogonal associated central axes 68 can be incorporated in a first aspect of a triple-axis whispering-gallery-mode-based seismometer 10" so as to provide for a triple-axis whispering-gallery-mode-based seismometer 10 that is compact, has relatively low power consumption and is capable of unattended operation. Each separate associated single-axis whispering-gallery-mode-based seismometers 10' would have a separated corresponding optical fiber 32 and associated photo-detector 112. In one embodiment, each separate associated single-axis whispering-gallery-mode-based seismometers 10' would use a separate associated tunable laser diode light source 110", whereas in another embodiment, different single-axis whispering-gallery-mode-based seismometers 10' can share a common tunable laser diode light source 110".

Figure 45:
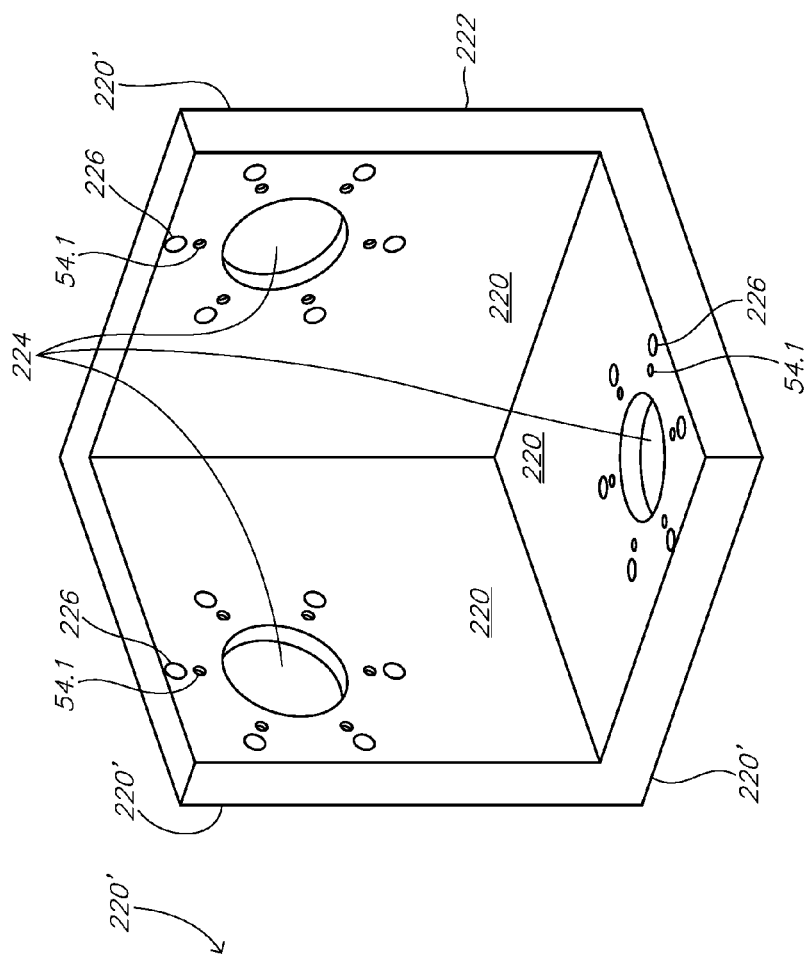
FIGS. 44 and 45 illustrate a second embodiment of a triple-axis whispering-gallery-mode-based seismometer incorporating three single-axis whispering-gallery-mode-based seismometers each depending from a different surface of a common support structure constituting the first housing portion of each whispering-gallery-mode-based seismometer, the different surfaces being relatively orthogonal to one another.
Figure 44:
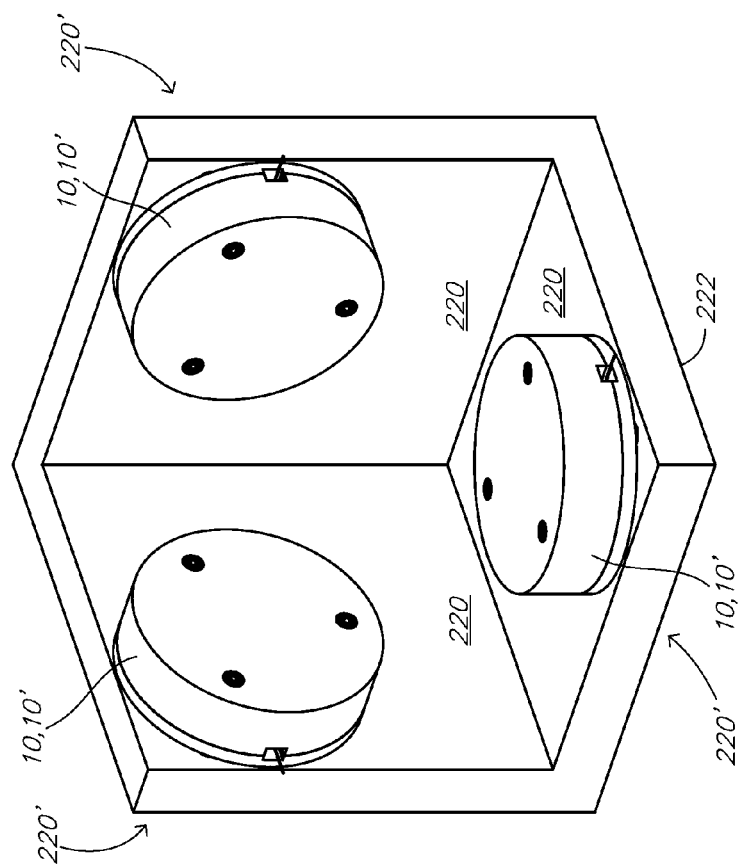

Referring to FIGS. 44 and 45, in accordance with a second aspect of a triple-axis whispering-gallery-mode-based seismometer 10''', the three single-axis whispering-gallery-mode-based seismometers 10' with relatively orthogonal associated central axes 68 are each attached to a separate face 220 of a common support structure 222, wherein the separate faces 220 are relatively orthogonal with respect to one another. Each face is machined with a corresponding recess 224 and corresponding first clearance holes 54.1 so as to effectively function as the third housing portion 42.3 of the corresponding associated single-axis whispering-gallery-mode-based seismometers 10' illustrated in FIG. 8, wherein the recesses 224 provide for accommodating each of the corresponding second proof-mass elements 12.2, and the first clearance holes 54.1 provide for assembling the corresponding inertial-reference subassemblies 74 with corresponding first screw fasteners 52.1 inserted from the corresponding opposing faces 220' of the common support structure 222. Each face 220 may also incorporate a set of clearance holes 226 for the head portions of the second screw fasteners 52.2 so as to provide for assembling the sensor subassembly 76 to the inertial-reference subassembly 74 of each single-axis whispering-gallery-mode-based seismometers 10' after the corresponding inertial-reference subassemblies 74 are first assembled onto the faces 220. FIGS. 44 and 45 illustrate the single-axis whispering-gallery-mode-based seismometers 10' assembled to faces 220 that are relatively concave with respect to one another, i.e. on the "inside" faces 220 of the common support structure 222. Alternatively, the single-axis whispering-gallery-mode-based seismometers 10' could be assembled to faces 220' that are relatively convex with respect to one another, i.e. on the "outside" faces 220' of the common support structure 222, or on a mix of "inside" 220 and "outside" 220' faces.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:
1. An apparatus, comprising:
 a. a housing;
 b. an optical fiber supported by or from said housing, wherein said optical fiber extends through a hollow interior portion of said housing;
 c. a spring-mass assembly comprising:
  i. a leaf spring; and
  ii. a proof mass operatively coupled to a central portion of said leaf spring, wherein an operative portion of said leaf spring and said proof mass are both located within said hollow interior portion of said housing, and a peripheral portion of said leaf spring is supported by said housing; and
 d. a whispering-gallery-mode-based optical resonator supported from said housing within said hollow interior portion thereof and in contact with a surface of said central portion of said spring-mass assembly, wherein said whispering-gallery-mode-based optical resonator provides for limiting a motion of said central portion of said spring-mass assembly towards an interior surface of said housing by generation of a reaction force responsive to a compression of said whispering-gallery-mode-based optical resonator between said central portion of said spring-mass assembly and said interior surface of said housing, said compression of said whispering-gallery-mode-based optical resonator causes a deformation thereof, an optical resonant frequency of said whispering-gallery-mode-based optical resonator is responsive to said deformation, a portion of said optical fiber is located proximally adjacent to said whispering-gallery-mode-based optical resonator, and said portion of said optical fiber located proximally adjacent to said whispering-gallery-mode-based optical resonator is sufficiently thin so as to provide for an evanescent coupling of light from said optical fiber to said whispering-gallery-mode-based optical resonator.

2. An apparatus as recited in claim 1, wherein said housing comprises separate first, second and third housing portions, said whispering-gallery-mode-based optical resonator and said optical fiber are each supported from said first housing portion, said leaf spring is peripherally supported between opposing planar surfaces of said second and third housing portions, said second and third housing portions are assembled to one another with said spring-mass assembly sandwiched therebetween, said first and second housing portions are assembled to one another so as to provide for said whispering-gallery-mode-based optical resonator to interact with said spring-mass assembly, and said second and third housing portions provide for clearance around said proof mass of said spring-mass assembly.

3. An apparatus as recited in claim 2, wherein said first housing portion provides for adjusting an axial position of said whispering-gallery-mode-based optical resonator relative to said spring-mass assembly following assembly of said first, second and third housing portions.

4. An apparatus as recited in claim 2, wherein said first housing portion comprises a portion of a separate rigid body.

5. An apparatus as recited in claim 4, wherein said separate rigid body incorporates a plurality of separate first housing portions oriented in a plurality of different directions, and each separate first housing portion of said plurality of separate first housing portions provides for cooperating with a corresponding separate set of second and third housing portions of a corresponding plurality of separate sets of second and third housing portions.

6. An apparatus as recited in claim 5, wherein said plurality of different directions are mutually orthogonal with respect to one another.

7. An apparatus as recited in claim 1, wherein said leaf spring is peripherally supported between opposing planar surfaces of corresponding separate proximally adjacent portions of said housing.

8. An apparatus as recited in claim 1, wherein said leaf spring comprises a structure formed of a sheet elastic material comprising, in plan view:

a. a central portion to which said proof mass is operatively coupled;
b. a peripheral portion supported by said housing; and
c. a plurality of at least three annularly-bounded sectors, wherein each annularly-bounded sector of said plurality of at least three annularly-bounded sectors comprises first and second serpentine elastic structures operatively coupling said central portion to said peripheral portion.

9. An apparatus as recited in claim 8, wherein each of said plurality of at least three annularly-bounded sectors are substantially similar to one another.

10. An apparatus as recited in claim 8, wherein said first and second serpentine elastic structures are mirror-image symmetric relative to a relatively central radially-extending elastic beam operatively coupling said first and second serpentine elastic structures to said central portion.

11. An apparatus as recited in claim 8, said peripheral portion of said leaf spring is clamped between separate portions of said housing.

12. An apparatus as recited in claim 1, wherein said leaf spring comprises a structure formed of a sheet elastic material comprising, in plan view: a plurality of at least three elastic structures connecting a central portion of said structure to a peripheral portion of said structure, wherein each elastic structure of said plurality of at least three elastic structures is substantially identically shaped, each said elastic structure of said plurality of at least three elastic structures is azimuthally equiangularly spaced, and equiradially located around and relative to a center of said central portion of said structure, each said elastic structure of said plurality of at least three elastic structures comprises at least one pair of serpentine profiles, and, for each pair of serpentine profiles of said at least one pair of serpentine profiles, each serpentine profile of said pair of serpentine profiles defines a corresponding edge of a common portion of said sheet elastic material.

13. An apparatus as recited in claim 1, wherein said leaf spring comprises a structure formed of a sheet elastic material comprising, in plan view: a plurality of at least three spiral-shaped elastic structures, wherein each spiral-shaped structure of said plurality of at least three spiral-shaped structures extends between said central portion of said leaf spring and said peripheral portion of said leaf spring, said plurality of at least three spiral-shaped structures are substantially uniformly azimuthally spaced relative to one another, and each said spiral-shaped structure of said plurality of at least three spiral-shaped structures is substantially identically shaped.

14. An apparatus as recited in claim 13, wherein a width of each said spiral-shaped structure is substantially invariant with respect to radial distance from a center of said central portion.

15. An apparatus as recited in claim 13, wherein a width of each said spiral-shaped structure increases with radial distance from a center of said central portion.

16. An apparatus as recited in claim 1, wherein said proof mass of said spring-mass assembly comprises first and second proof mass elements operatively coupled to opposing sides of said central portion of said leaf spring.

17. An apparatus as recited in claim 8, wherein said proof mass comprises at least one proof mass element operatively coupled to at least one corresponding side of said central portion of said leaf spring, at least one said proof mass element comprises first and second circular profiles on corresponding first and second sides of said proof mass element, said first circular profile is larger than said central portion of said leaf spring, said second circular profile is no larger than a bounding minor diameter of said plurality of at least three annularly-bounded sectors of said leaf spring, and said second side of said proof mass element is operatively coupled to said central portion of leaf spring within said second circular profile.

18. An apparatus as recited in claim 1, wherein said optical fiber extends through a hole or slot in each of two opposing edgewall wall portions of said housing.

19. An apparatus as recited in claim 18, wherein said optical fiber is adhesively bonded within said hole or slot in at least one of said two opposing edgewall portions of said housing.

20. An apparatus as recited in claim 1, wherein said optical fiber comprises a single-mode optical fiber.

21. An apparatus as recited in claim 1, wherein said whispering-gallery-mode-based optical resonator comprises a microsphere between 200 and 1500 micrometers in diameter.

22. An apparatus as recited in claim 21, wherein said microsphere is constructed from a compliant dielectric material cured with a curing agent with ratio of said compliant dielectric material to said curing agent in a ratio having a value between 10:1 and 60:1.

23. An apparatus as recited in claim 21, wherein said microsphere is either operatively coupled to or formed on a fiber stub, and said fiber stub is inserted in a hole in an associated microsphere support depending or supported from said interior surface of said housing so as to provide for transversely locating said microsphere relative to said housing.

24. An apparatus as recited in claim 23, wherein said microsphere support comprises a cylindrical collar or ferrule located within a central bore in a support platform, an axial position of said cylindrical collar or ferrule is adjustable during assembly of said apparatus, said support platform is operatively coupled to said interior surface of said housing, and an axial position of said support platform is adjustable relative to said interior surface of said housing so as to provide for adjusting an axial position of said microsphere relative to said optical fiber.

25. An apparatus as recited in claim 24, wherein said support platform is biased away from said interior surface of said housing by a spring element, and said support platform is operatively coupled to said housing with at least one adjusting screw operative between said housing and said support platform that provides for adjusting said axial position of said support platform in cooperation with said spring element, so as to provide for adjusting said axial position of said microsphere relative to said spring-mass assembly.

26. An apparatus as recited in claim 24, wherein said optical fiber is positively positioned in an axial direction by said support platform and positively positioned in a transverse direction by an optical fiber support depending from said support platform, wherein said axial direction is parallel to a direction of said motion of said central portion of said spring-mass assembly, and said transverse direction is normal to said axial direction.

27. An apparatus as recited in claim 1, further comprising a laser that provides for generating laser light that is operatively coupled to said optical fiber, wherein said laser light is generated at a corresponding optical frequency, and said laser provides for said optical frequency of said laser light to operate within a range of optical frequencies.

28. An apparatus as recited in claim 27, wherein said laser comprises a diode laser that provides for changing said optical frequency of said laser light by adjusting a drive current supplied to said diode laser.

29. An apparatus as recited in claim 27, wherein said laser comprises a distributed feedback laser.

30. An apparatus as recited in claim 1, further comprising a photodetector that provides for detecting said light in said optical fiber following an interaction of said light with said whispering-gallery-mode-based optical resonator, wherein an intensity of said light detected by said detector is responsive to said deformation of said whispering-gallery-mode-based optical resonator responsive to said compression of said whispering-gallery-mode-based optical resonator.

31. An apparatus as recited in claim 27, further comprising a photodetector that provides for detecting said laser light in said optical fiber following an interaction of said laser light with said whispering-gallery-mode-based optical resonator, wherein an intensity of said laser light detected by said photodetector is responsive to said deformation of said whispering-gallery-mode-based optical resonator responsive to said compression of said whispering-gallery-mode-based optical resonator, said laser light is operatively coupled from said laser to a first end of said optical fiber, and said photodetector provides for detecting said laser light from a second end of said optical fiber, wherein said optical fiber extends between said first and second ends.

32. An apparatus as recited in claim 27, further comprising:
a. a photodetector that provides for detecting said laser light in said optical fiber following an interaction of said laser light with said whispering-gallery-mode-based optical resonator, wherein an intensity of said laser light detected by said photodetector is responsive to said deformation of said whispering-gallery-mode-based optical resonator responsive to said compression of said whispering-gallery-mode-based optical resonator; and
b. a detection system that provides for controlling said optical frequency of said laser light responsive to a first detected signal from said photodetector, and that provides for determining a second detected signal from said first detected signal.

33. An apparatus as recited in claim 32, wherein said detection system provides for generating a sawtooth waveform control signal and provides for adjusting said sawtooth waveform control signal responsive to a detection of a resonant frequency of said whispering-gallery-mode-based optical resonator responsive to said first detected signal.

34. An apparatus as recited in claim 32, wherein said second detected signal comprises a measure of acceleration of said housing responsive to a detected resonant frequency of said whispering-gallery-mode-based optical resonator responsive to said first detected signal.

35. An apparatus as recited in claim 32, wherein said detection system comprises:
a. an analog-to-digital converter operatively associated with said photodetector;
b. a digital-to-analog converter operatively associated with said laser; and
c. a signal processor either distinct from or incorporating at least one element selected from said analog-to-digital converter and said digital-to-analog converter, wherein said signal processor provides for generating a first digital signal to said digital-to-analog converter so as to provide for periodically sweeping said optical frequency of said laser over said range of optical frequencies, said signal processor provides for receiving a second digital signal from said analog-to-digital converter responsive to said intensity of said laser light detected by said detector, said signal processor provides for generating a measure of said optical resonant frequency of said whispering-gallery-mode-based optical resonator responsive to said second digital signal, and said signal processor provides for adjusting said range of optical frequencies over which said optical frequency of said laser is swept so as to provide for tracking said optical resonant frequency of said whispering-gallery-mode-based optical resonator.

36. An apparatus as recited in claim 35, wherein said signal processor further provides for determining a measure of instantaneous acceleration of said housing responsive to said measure of said optical resonant frequency of said whispering-gallery-mode-based optical resonator.

37. An apparatus as recited in claim 36, wherein said signal processor further provides for determining a frequency spectrum of said measure of instantaneous acceleration of said housing.

38. An apparatus as recited in claim 35, wherein said signal processor comprises a field programmable gate array (FPGA).

39. A method, comprising:
a. receiving laser light into an optical fiber;
b. operatively coupling said laser light from said optical fiber into a whispering-gallery-mode-based optical resonator;
c. operatively coupling a spring of a spring-mass assembly to a housing structure; and
d. locating said whispering-gallery-mode-based optical resonator between said spring-mass assembly and said housing structure so as to provide for compressing said whispering-gallery-mode-based optical resonator between said spring-mass assembly and said housing structure responsive to a dynamic compression force from said spring-mass assembly responsive to a motion of said housing structure relative to an inertial frame of reference.

40. A method as recited in claim 39, further comprising generating said laser light at an optical frequency responsive to a control signal, and operatively coupling said laser light to said optical fiber.

41. A method as recited in claim 39, further comprising locating a thinned portion of said optical fiber adjacent to said whispering-gallery-mode-based optical resonator so as to provide for evanescently coupling said laser light to said whispering-gallery-mode-based optical resonator.

42. A method as recited in claim 41, wherein said whispering-gallery-mode-based optical resonator comprises a microsphere, and the operation of locating said thinned portion of said optical fiber adjacent to said whispering-gallery-mode-based optical resonator comprises contacting said microsphere with said thinned portion of said optical fiber.

43. A method as recited in claim 42, wherein the operation of locating said thinned portion of said optical fiber adjacent to said whispering-gallery-mode-based optical resonator comprises:
a. locating said thinned portion of said optical fiber within a plane intersecting a region proximate to a center of said microsphere, wherein said region proximate to said center of said microsphere is within an evanescent field of said thinned portion of said optical fiber, wherein said plane intersecting said region proximate to said center of said microsphere is substantially orthogonal to a direction of motion of said spring-mass assembly; and
b. contacting said microsphere with said thinned portion of said optical fiber within said plane.

44. A method as recited in claim 39, further comprising supporting said whispering-gallery-mode-based optical resonator from one of said housing structure or a proof mass of said spring-mass assembly so as to provide for constraining movement of said whispering-gallery-mode-based optical resonator in a direction that is transverse to a direction of motion of said spring-mass assembly.

45. A method as recited in claim 39, further comprising supporting said optical fiber from opposing edge portions of said housing structure.

46. A method as recited in claim 41, further comprising applying a tension to said thinned portion of said optical fiber so as to provide for locating said optical fiber adjacent to said whispering-gallery-mode-based optical resonator.

47. A method as recited in claim 39, wherein said spring of said spring-mass assembly comprises a leaf spring that is configured to provide for substantially greater compliance in a direction normal to a surface of said leaf spring relative to a compliance in a direction along said surface of said leaf spring.

48. A method as recited in claim 47, further comprising attaching at least one proof mass element to a corresponding at least one side of a central portion of said leaf spring.

49. A method as recited in claim 47, further comprising clamping a peripheral region of said leaf spring to an edge portion of said housing structure.

50. A method as recited in claim 39, further comprising detecting said laser light from said optical fiber following an interaction of said laser light with said whispering-gallery-mode-based optical resonator.

51. A method as recited in claim 40, further comprising:
  a. generating said control signal so as to provide for scanning said optical frequency of said laser light over a range of optical frequencies;
  b. detecting said laser light from said optical fiber following an interaction of said laser light with said whispering-gallery-mode-based optical resonator; and
  c. detecting a resonant frequency of said whispering-gallery-mode-based optical resonator from a dip in a detected signal, wherein said detected signal is generated by the operation of detecting said laser light from said optical fiber.

52. A method as recited in claim 51, wherein said control signal comprises a sawtooth waveform to control a current applied to a laser diode to generate said laser light.

53. A method as recited in claim 40, further comprising:
  a. generating a first control signal so as to provide for scanning said optical frequency of said laser light over a first range of optical frequencies;
  b. detecting said laser light from said optical fiber following an interaction of said laser light with said whispering-gallery-mode-based optical resonator; and
  c. detecting a first resonant frequency of said whispering-gallery-mode-based optical resonator from a first detected signal, wherein said first detected signal is generated by the operation of detecting said laser light from said optical fiber responsive to the operation of scanning said optical frequency of said laser light over said first range of optical frequencies.

54. A method as recited in claim 53, wherein the operation of detecting said first resonant frequency comprises detecting a dip in said first detected signal.

55. A method as recited in claim 53, wherein the operation of detecting said first resonant frequency comprises detecting a localized peak in said first detected signal.

56. A method as recited in claim 53, wherein the operation of detecting said first resonant frequency comprise generating a mathematical model of said first detected signal with respect to optical frequency and finding an optical frequency at an extremum of said mathematical model.

57. A method as recited in claim 53, wherein the operation of detecting said first resonant frequency is responsive to a cross-correlation of said first detected signal with a corresponding mathematical representation of an associated resonance condition.

58. A method as recited in claim 53, further comprising:
  a. generating a second control signal so as to provide for scanning said optical frequency of said laser light over a second range of optical frequencies, wherein said second range of optical frequencies is narrower than said first range of optical frequencies and includes said first resonant frequency;
  b. detecting a second resonant frequency of said whispering-gallery-mode-based optical resonator in a second detected signal, wherein said second detected signal is generated by the operation of detecting said laser light from said optical fiber responsive to the operation of scanning said optical frequency of said laser light over said second range of optical frequencies.

59. A method as recited in claim 58, wherein said second range of optical frequencies includes only one optical resonance condition of said whispering-gallery-mode-based optical resonator.

60. A method as recited in claim 58, further comprising tracking said second resonant frequency and adjusting said second range of optical frequencies responsive to the operation of tracking said second resonant frequency.

61. A method as recited in claim 51, further comprising determining a force from said spring-mass assembly acting upon said whispering-gallery-mode-based optical resonator from said resonant frequency of said whispering-gallery-mode-based optical resonator.

62. A method as recited in claim 51, further comprising determining an acceleration of said housing structure from said resonant frequency of said whispering-gallery-mode-based optical resonator.

* * * * *